United States Patent
Kim et al.

(10) Patent No.: US 12,219,617 B2
(45) Date of Patent: Feb. 4, 2025

(54) PROCESS FOR TRANSMITTING AND RECEIVING LOW-LATENCY DATA IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

(21) Appl. No.: 17/784,611

(22) PCT Filed: Dec. 10, 2020

(86) PCT No.: PCT/KR2020/018054
§ 371 (c)(1),
(2) Date: Jun. 10, 2022

(87) PCT Pub. No.: WO2021/118257
PCT Pub. Date: Jun. 17, 2021

(65) Prior Publication Data
US 2023/0032578 A1 Feb. 2, 2023

(30) Foreign Application Priority Data

Dec. 11, 2019 (KR) .................. 10-2019-0165071

(51) Int. Cl.
*H04W 74/08* (2024.01)
*H04W 28/06* (2009.01)
*H04W 84/12* (2009.01)

(52) U.S. Cl.
CPC ....... *H04W 74/0866* (2013.01); *H04W 28/06* (2013.01); *H04W 84/12* (2013.01)

(58) Field of Classification Search
CPC ........ H04L 1/00; H04W 28/02; H04W 28/06; H04W 74/006; H04W 74/0808; H04W 74/0866; H04W 84/12
See application file for complete search history.

(56) References Cited

U.S. PATENT DOCUMENTS 9,351,184 B2 * 5/2016 Sampath ............... H04W 24/08
9,515,941 B2 * 12/2016 Howes ................ H04L 47/6275
(Continued)

FOREIGN PATENT DOCUMENTS

AU   2017301462 A1 * 1/2019 ............ H04W 16/14
AU   2017301462 B2 * 11/2021 ............ H04W 16/14
(Continued)

OTHER PUBLICATIONS

Bankof et al., Enabling Low Latency Communications in Wi-Fi Networks, Sep. 9, 2018, 2018 IEEE 29th Annual International Symposium on Personal, Indoor and Mobile Radio Communications (PIMRC), DOI: 10.1109/PIMRC.2018.8580914 (Year: 2018).*
(Continued)

*Primary Examiner* — Eric Nowlin
(74) *Attorney, Agent, or Firm* — LEE, HONG, DEGERMAN, KANG & WAIMEY

(57) ABSTRACT

One embodiment of the present specification relates to a method for performing low-latency communications. According to one embodiment, an interframe space (IFS) for low-latency data may be suggested. The interframe space for low-latency data may be set to be greater than PIFS and smaller than DIFS. On the basis of the interframe space for low-latency data, a reception STA may perform EDCA and transmit low-latency data to a transmission STA.

17 Claims, 33 Drawing Sheets

(56) References Cited

U.S. PATENT DOCUMENTS

| | | | |
|---|---|---|---|
| 10,075,978 B2 * | 9/2018 | Kang | H04W 74/085 |
| 10,342,044 B2 * | 7/2019 | Yerramalli | H04W 72/569 |
| 10,492,147 B2 | 11/2019 | Del Carpio Vega et al. | |
| 10,560,963 B2 * | 2/2020 | Mukherjee | H04W 74/0816 |
| 11,051,319 B2 * | 6/2021 | Asterjadhi | H04L 5/006 |
| 11,184,923 B2 * | 11/2021 | Yerramalli | H04W 74/0808 |
| 11,540,204 B1 * | 12/2022 | Ahmed | H04W 72/0446 |
| 11,638,280 B2 * | 4/2023 | Asterjadhi | H04W 72/52 370/329 |
| 11,765,706 B2 * | 9/2023 | H?hne | H04W 72/0453 455/509 |
| 11,871,213 B2 * | 1/2024 | Luong | H04W 76/36 |
| 2013/0230038 A1 * | 9/2013 | Walton | H04W 74/0808 370/338 |
| 2014/0126471 A1 * | 5/2014 | Sampath | H04W 48/16 370/328 |
| 2014/0146677 A1 * | 5/2014 | Howes | H04L 47/2441 370/235 |
| 2017/0156161 A1 * | 6/2017 | Kang | H04W 74/085 |
| 2017/0339721 A1 * | 11/2017 | Mukherjee | H04W 72/566 |
| 2018/0027590 A1 * | 1/2018 | Yerramalli | H04W 16/14 370/328 |
| 2019/0268940 A1 * | 8/2019 | Yerramalli | H04W 76/28 |
| 2020/0029350 A1 * | 1/2020 | Asterjadhi | H04W 72/543 |
| 2020/0077421 A1 * | 3/2020 | Asterjadhi | H04L 5/006 |
| 2021/0392506 A1 * | 12/2021 | Luong | H04W 74/006 |
| 2022/0095305 A1 * | 3/2022 | H?hne | H04W 74/002 |
| 2023/0284250 A1 * | 9/2023 | Yu | H04W 74/002 370/329 |
| 2023/0337227 A1 * | 10/2023 | Asterjadhi | H04W 72/1268 |
| 2023/0403704 A1 * | 12/2023 | Park | H04W 72/23 |

FOREIGN PATENT DOCUMENTS

| | | | | |
|---|---|---|---|---|
| CA | 3028155 A1 | * | 2/2018 | H04W 16/14 |
| CN | 103327638 A | * | 9/2013 | |
| CN | 109496458 A | * | 3/2019 | H04W 16/14 |
| CN | 113170509 A | * | 7/2021 | H04W 16/14 |
| CN | 113170509 B | * | 6/2024 | H04W 16/14 |
| EP | 3320743 B1 | * | 7/2020 | H04W 74/0808 |
| EP | 3888407 A1 | * | 10/2021 | H04W 16/14 |
| EP | 3915310 A1 | * | 12/2021 | H04W 72/02 |
| EP | 4358583 A1 | * | 4/2024 | H04W 28/16 |
| JP | 2006503479 A | * | 1/2006 | |
| KR | 20160018438 | | 2/2016 | |
| KR | 20180057755 | | 5/2018 | |
| WO | WO-2018022229 A1 | * | 2/2018 | H04W 16/14 |
| WO | WO-2020112534 A1 | * | 6/2020 | H04W 16/14 |
| WO | WO-2020151816 A1 | * | 7/2020 | H04W 72/02 |

OTHER PUBLICATIONS

Hoiland-Jorgensen et al., Ending the Anomaly: Achieving Low Latency and Airtime Fairness in WiFi, Jul. 12, 2017, 2017 USENIX Annual Technical Conference (USENIX ATC '17) (Year: 2017).*

Huawei, HiSilicon, "Further evaluation of coexistence in 6GHZ," 3GPP TSG-RAN WG1 Meeting #96bits, R1-1903935, Mar. 2019, 17 pages.

PCT International Application No. PCT/KR2020/018054, International Search Report dated Mar. 9, 2021, 4 pages.

* cited by examiner

FIG. 1
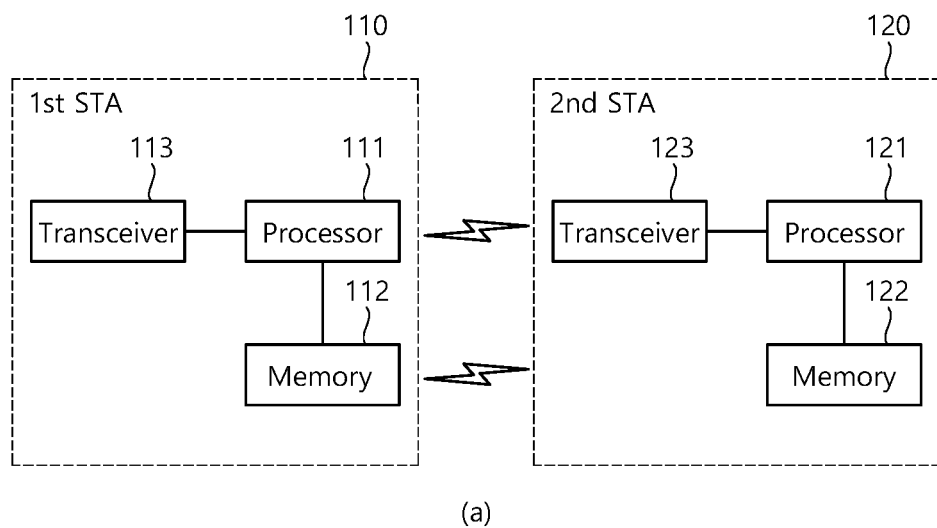
(a)
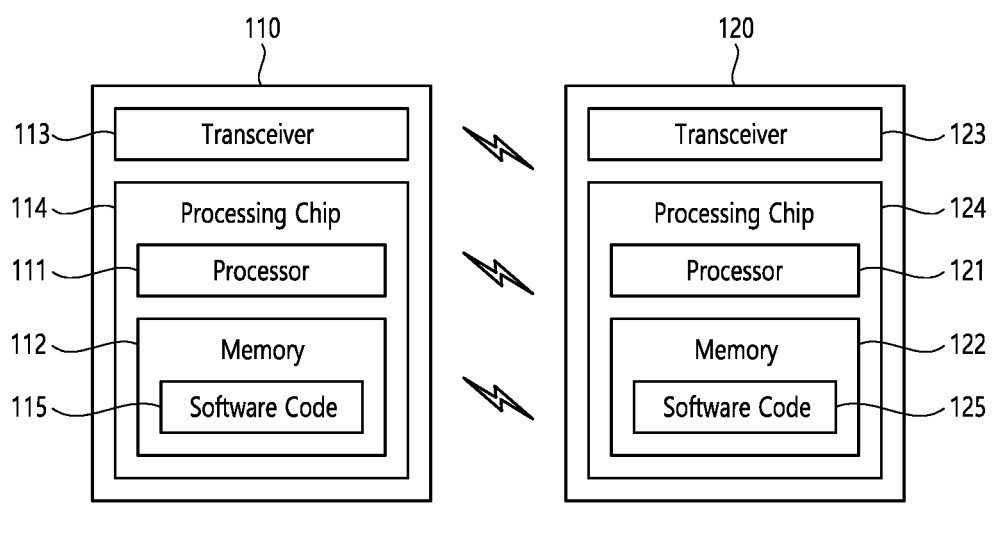
(b)

FIG. 2
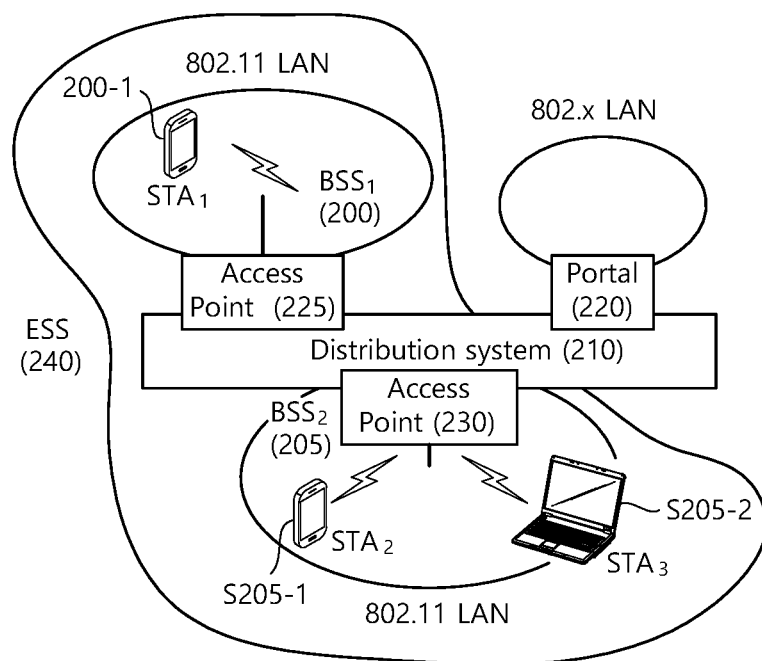
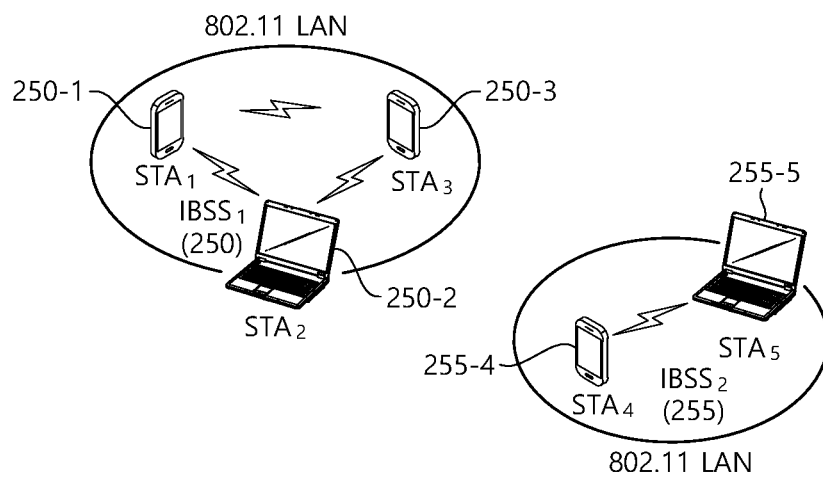

| Multi-band support (2410) | Low latency support (2420) | 16 Stream support (2430) | 320 MHz support (2440) |

| Element ID | Length (55) | TS Info | Nominal MSDU Size | Maximum MSDU Size | Minimum Service Interval | Maximum Service Interval | Inactivity Interval | Suspension Interval |
|---|---|---|---|---|---|---|---|---|
| 1 | 1 | 3 | 2 | 2 | 4 | 4 | 4 | 4 |

Octets:

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets:

| Element ID | Length (55) | TS Info | Nominal MSDU Size | Maximum MSDU Size | Minimum Service Interval | Maximum Service Interval | Inactivity Interval | Suspension Interval | Delay Jitter | Required Packet Loss |
|---|---|---|---|---|---|---|---|---|---|---|
| 1 | 1 | 3 | 2 | 2 | 4 | 4 | 4 | 4 | 2 | 2 |

2610  2620

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets:

PROCESS FOR TRANSMITTING AND RECEIVING LOW-LATENCY DATA IN WIRELESS LAN SYSTEM

CROSS-REFERENCE TO RELATED APPLICATIONS

This application is the National Stage filing under 35 U.S.C. 371 of International Application No. PCT/KR2020/018054, filed on Dec. 10, 2020, which claims the benefit of earlier filing date and right of priority to Korean Application No. 10-2019-0165071, filed on Dec. 11, 2019, the contents of which are all incorporated by reference herein in their entireties.

BACKGROUND

Field of the Disclosure

This specification relates to a technique for transmitting and receiving data in wireless communication, and more particularly, to a method and apparatus for transmitting and receiving low-latency data in a wireless LAN system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Problem

Recently, as wired/wireless traffic has exploded, time delay-sensitive traffic has also increased significantly. Among the time delay-sensitive traffic, real-time audio/video transmission accounts for a large proportion. According to the proliferation of multimedia devices, the need to support time delay-sensitive traffic even in a wireless environment has increased. However, in a wireless environment rather than a wired environment, since the transmission speed is lower than that of the wired environment and there is a problem of interference from the surroundings, various methods are required to support time delay-sensitive traffic.

In particular, wireless LAN is a communication system that must compete equally in the Industrial Scientific and Medical (ISM) band without a channel monopoly by a central base station. Accordingly, it is relatively more difficult for a wireless LAN to support traffic sensitive to time delay, compared to other communications other than the wireless LAN. Accordingly, in the present specification, a technique for supporting traffic sensitive to time delay may be proposed.

Technical Solutions

According to various embodiments, a method performed by a receiving STA in a wireless local area network system may comprise: receiving information on an inter-frame space (IFS) for low-latency data, wherein the inter-frame space for the low-latency data is configured to be larger than a Point Coordination Function Inter-frame Space (PIFS) and smaller than a Distributed Inter-Frame Space (DIFS); performing channel access through an Enhanced Distributed Channel Access (EDCA) based on the inter-frame space for the low-latency data; and transmitting the low-latency data based on the channel access.

Technical Effects

According to an embodiment of the present specification, a method for supporting traffic sensitive to time delay may be proposed. In order to receive time delay-sensitive traffic, the AP may configure the STA to use a shorter inter-frame space than the conventional standard in order to preferentially transmit traffic sensitive to time delay. The inter-frame space may be set smaller than a DIFS and larger than a PIFS. Accordingly, there is an effect that the STA can preferentially transmit traffic sensitive to time delay over other STAs based on the interframe space.

According to an embodiment of the present specification, an inter-frame space (IFS) for transmitting low-latency traffic may be newly proposed. In addition, the duration in which the inter-frame space for transmitting low-latency traffic is used may be limited. By using the interframe space for transmitting low-latency traffic by the STA, there is the effect of optimizing network performance and appropriately transmitting and receiving traffic (or data) sensitive to time delay.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 24 shows an example of an EHT Capability information element field configuration.

FIG. 25 shows an example of the TSPEC element field configuration.

FIG. 26 shows another example of the TSPEC element field configuration.

DETAILED DESCRIPTION

Figure 3:
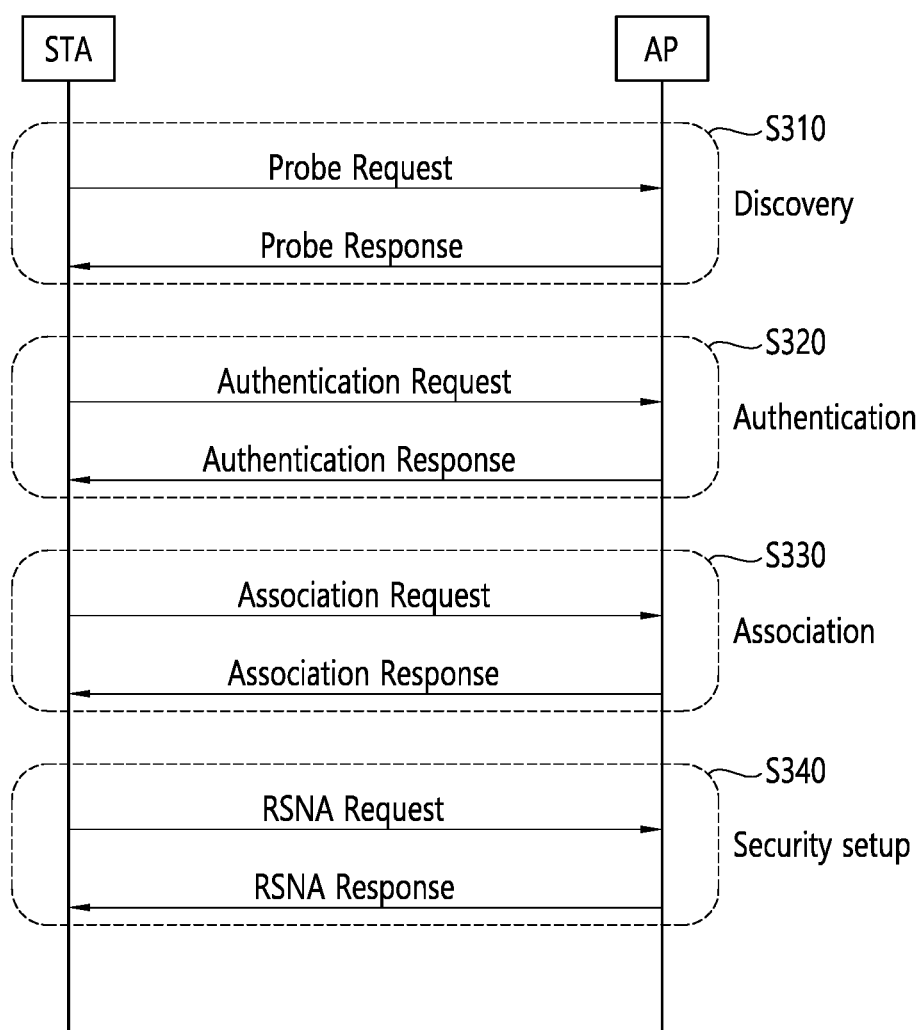
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
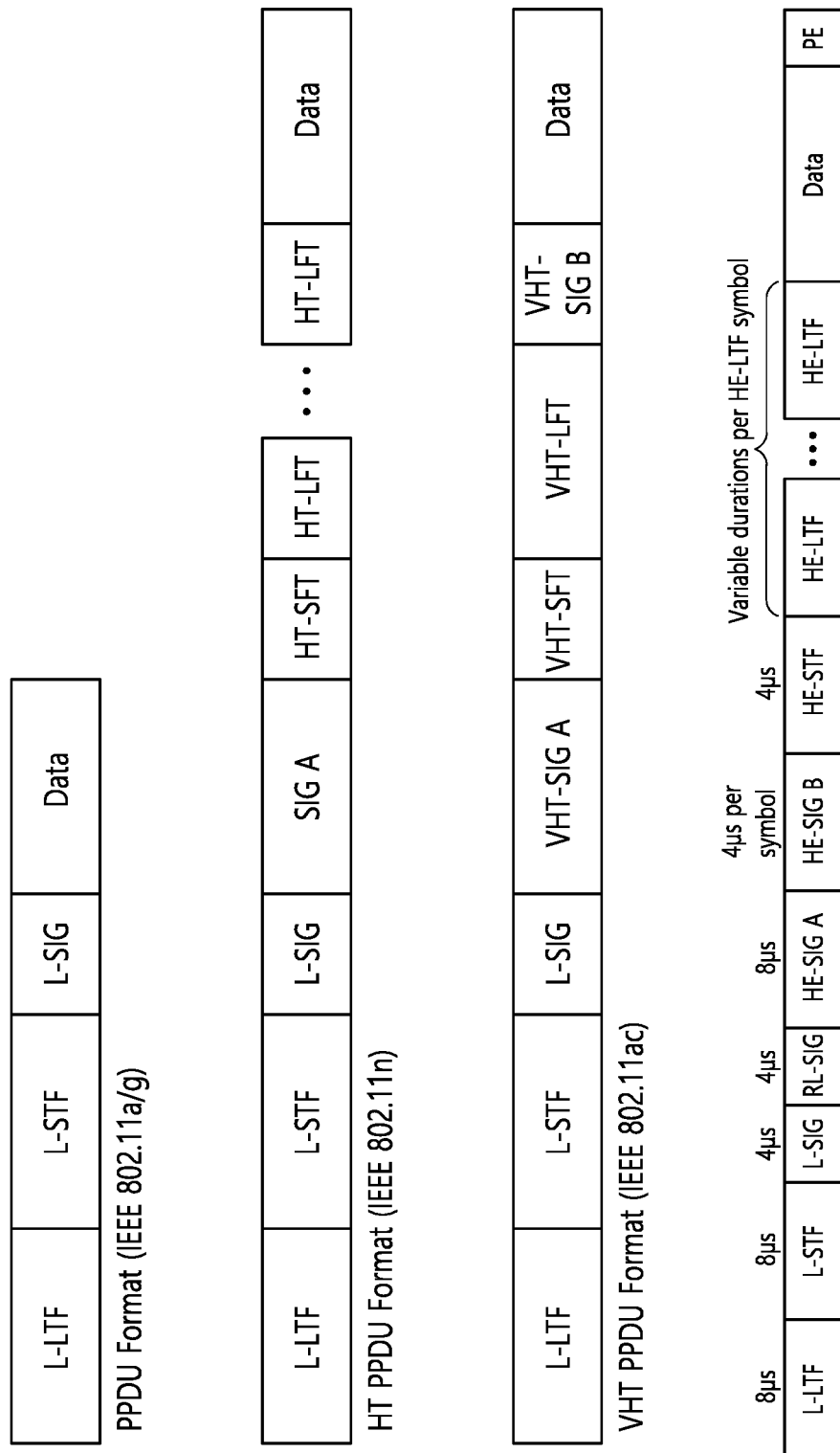
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
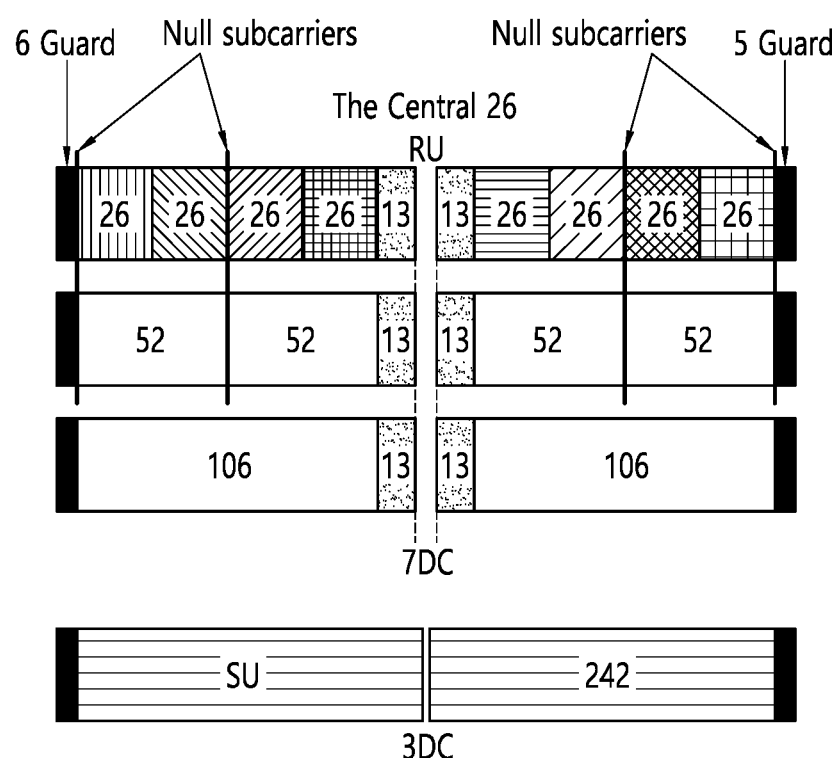
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
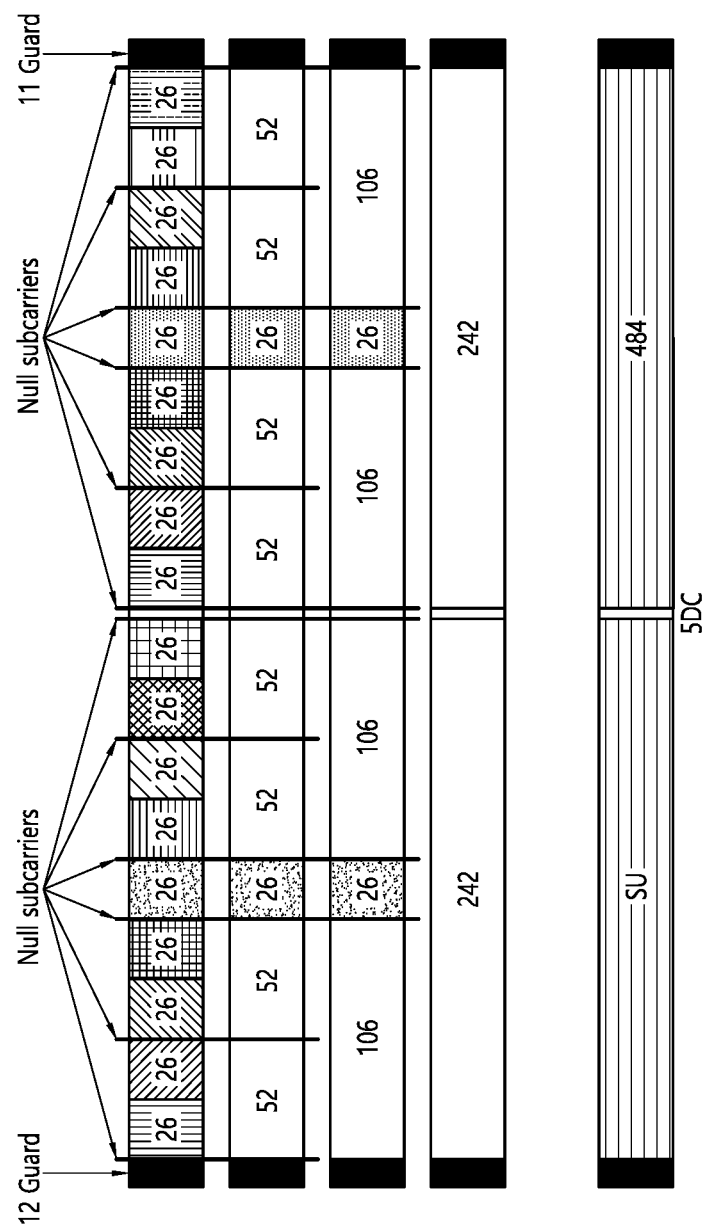
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40

MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
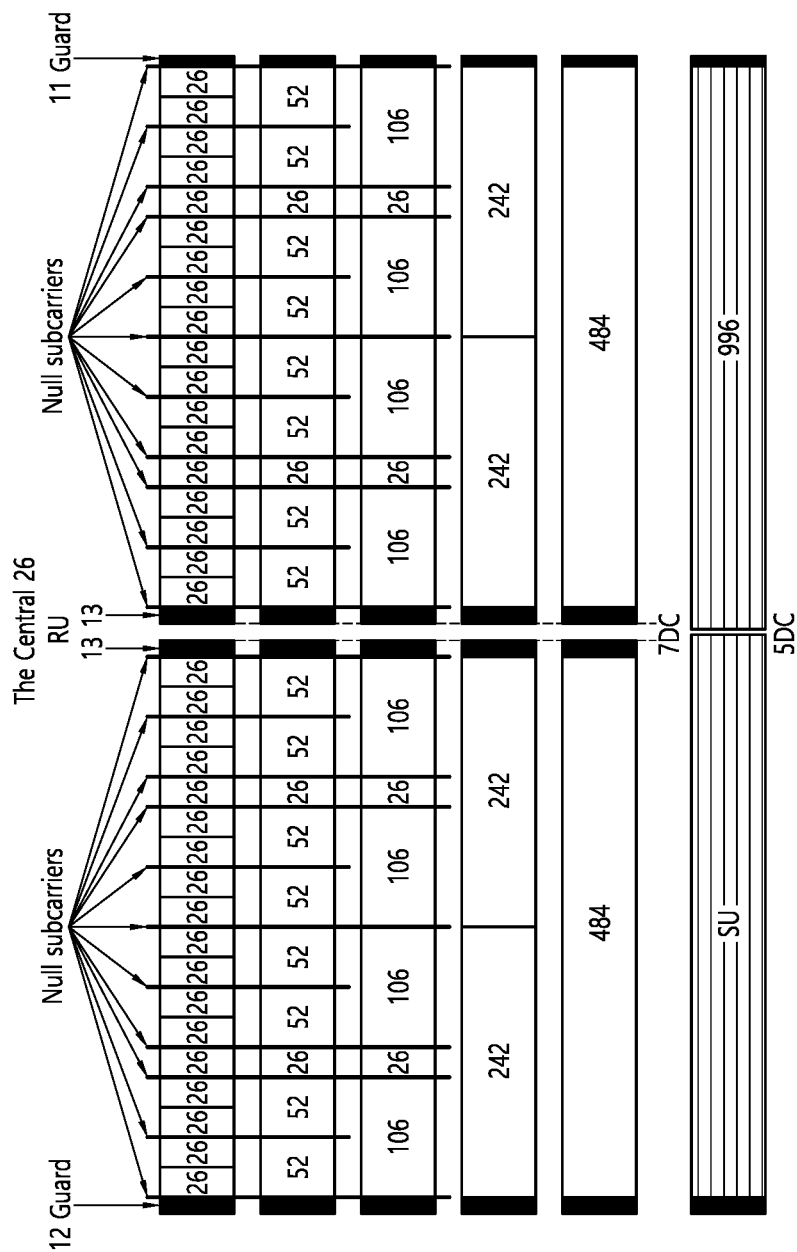
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
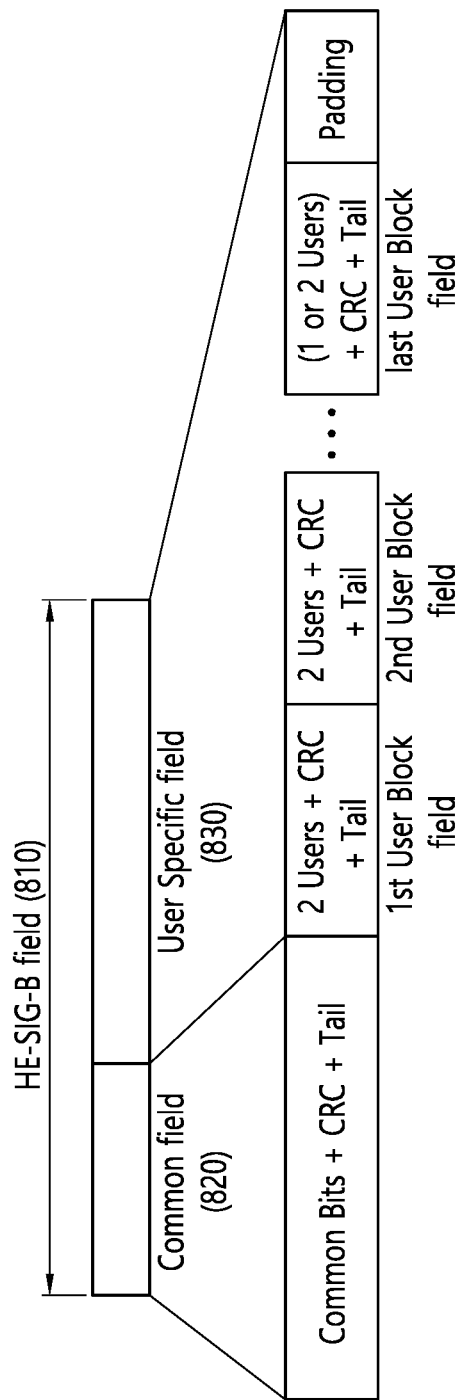
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | | | | 106 | 26 | 26 | 26 | 26 | 26 | 8 |
| 01001$y_2y_1y_0$ | | | | | 106 | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
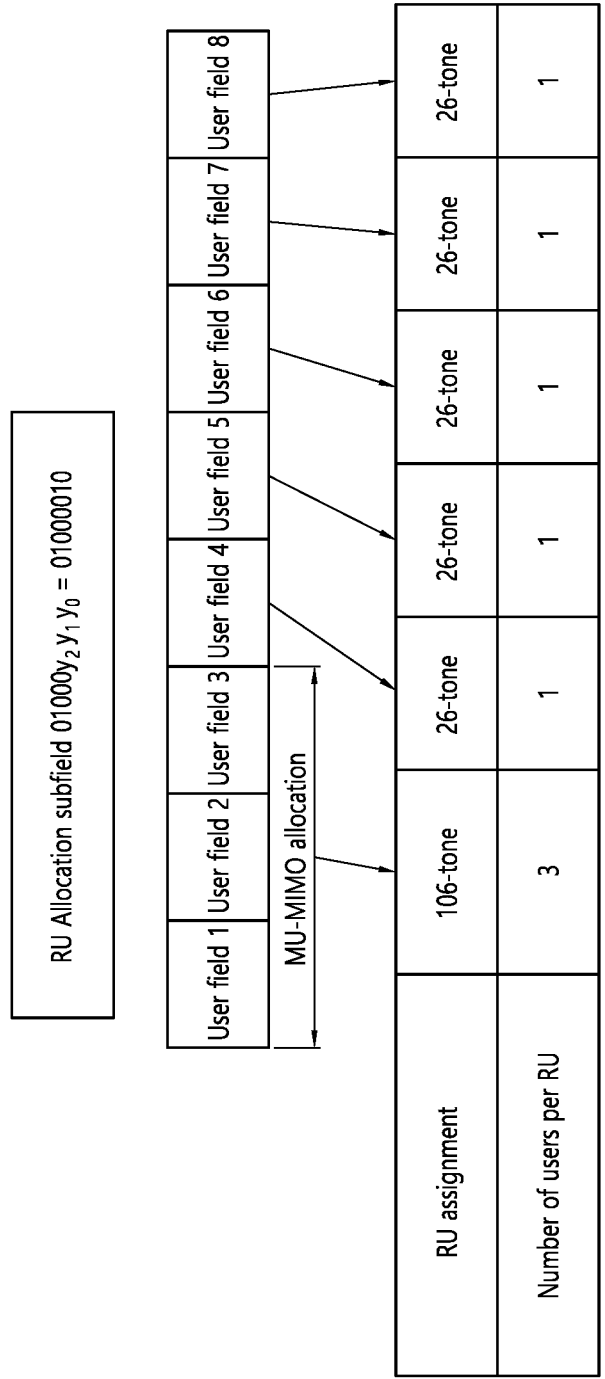
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3 ... B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS [2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
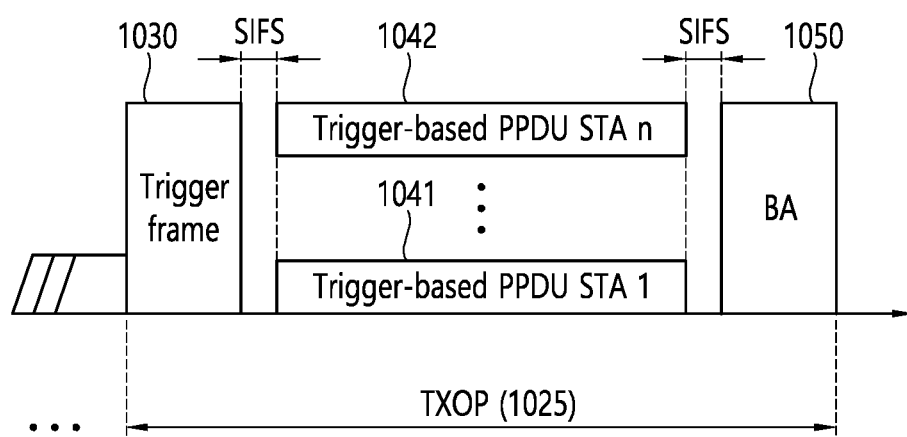
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
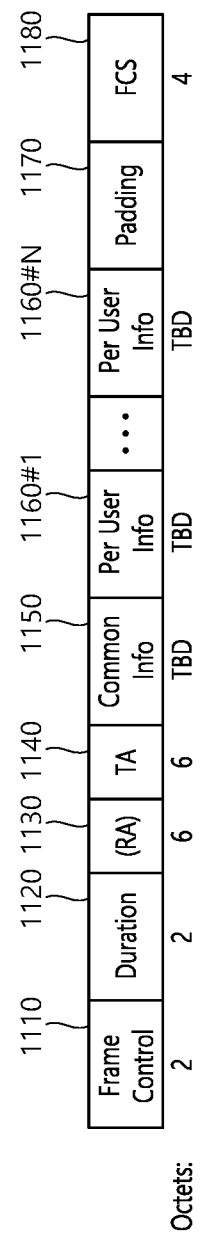
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160#1 to 1160#N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160#1 to 1160#N shown in FIG. 11 may include a plurality of subfields.

Figure 12:
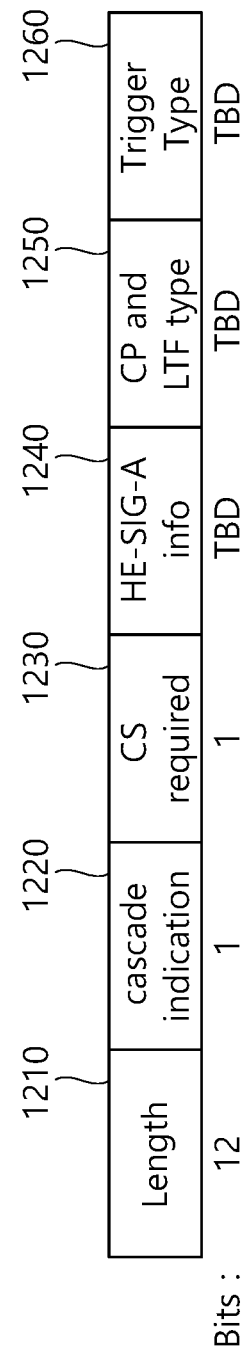
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
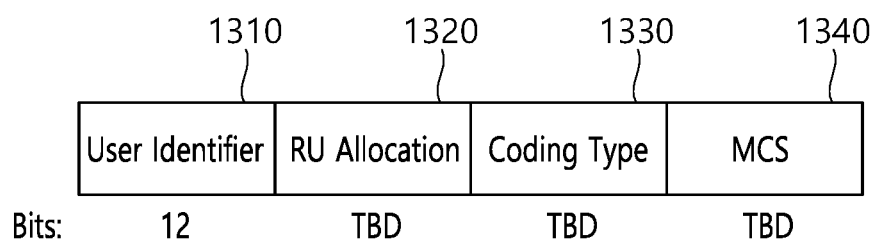
FIG. 13 illustrates an example of a subfield included in a per user information field.

FIG. 13 illustrates an example of a subfield included in a per user information field. A user information field 1300 of FIG. 13 may be understood as any one of the per user information fields 1160#1 to 1160#N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
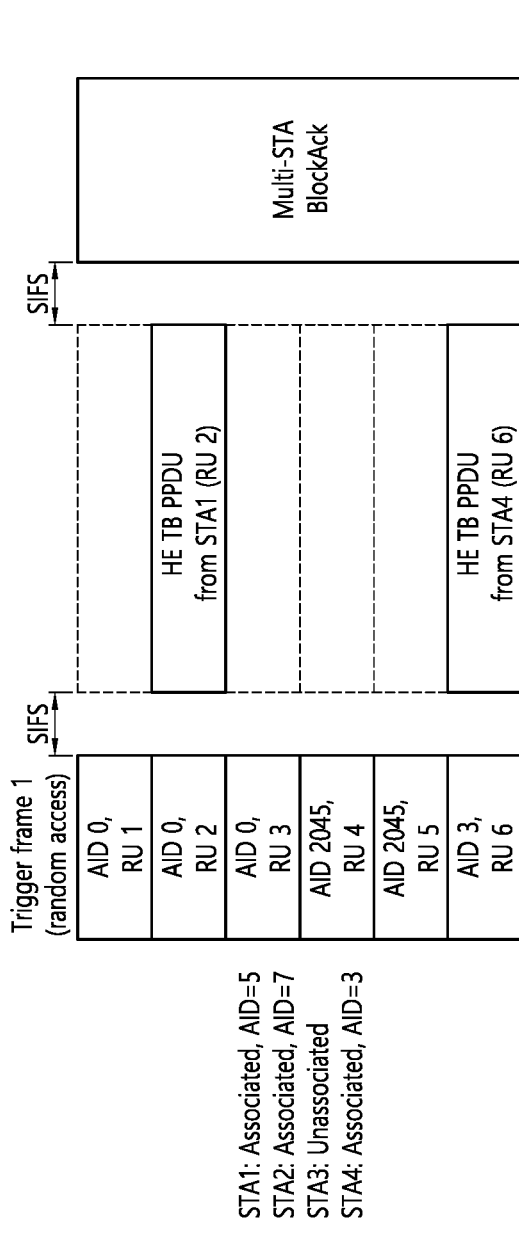
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
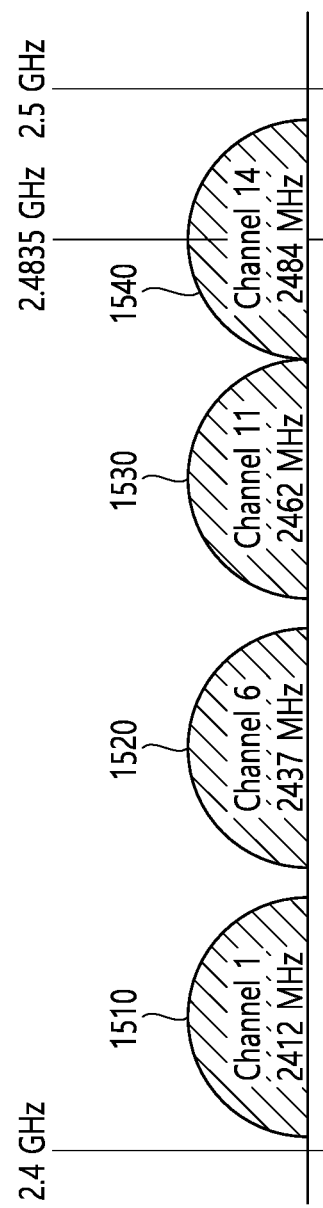
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be $(2.407+0.005*N)$ GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
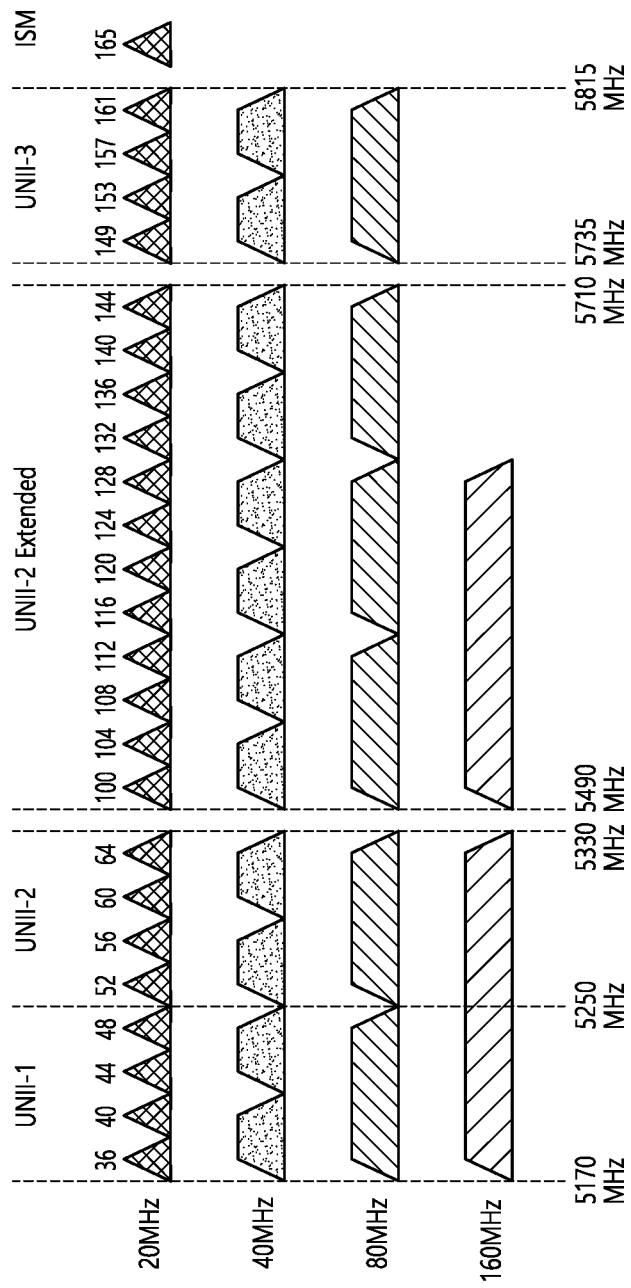
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
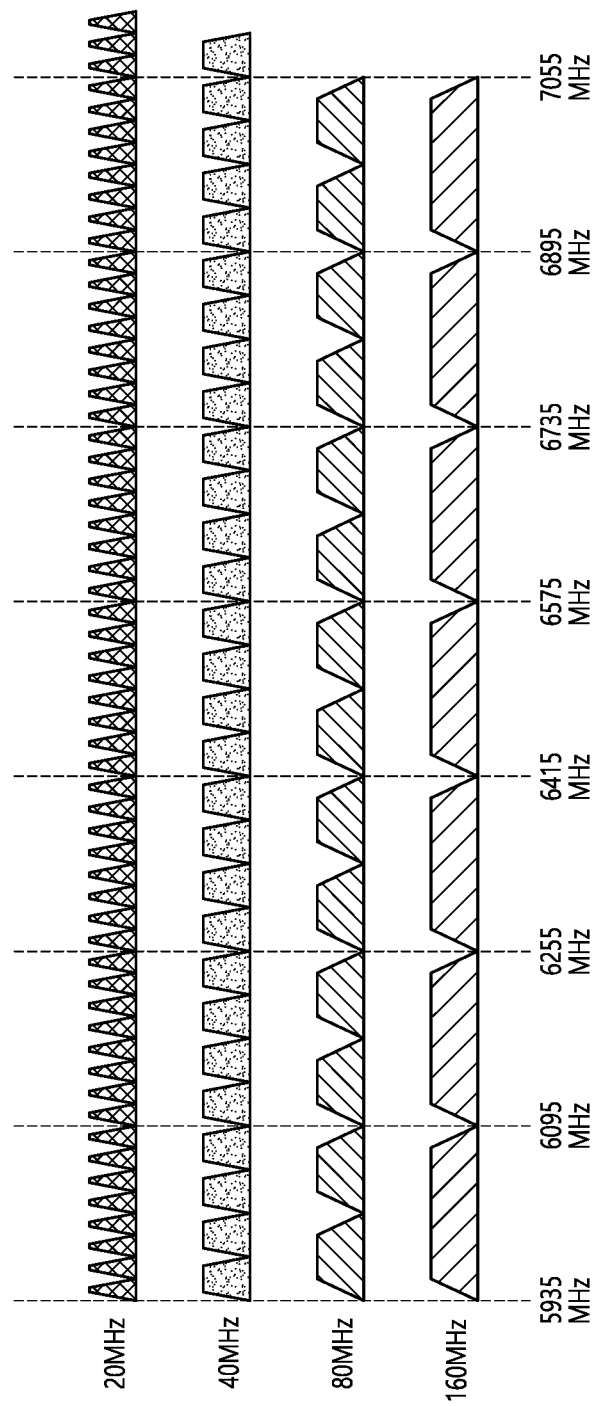
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 µs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 µs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | 106 | | | | 1 |
| 17 | 26 | 26 | 52 | | 26 | 106 | | | | 1 |
| 18 | 52 | | 26 | 26 | 26 | 106 | | | | 1 |
| 19 | 52 | | 52 | | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | | 106 | | 26 | 26 | 26 | 26 | 26 | 1 |
| 21 | | | 106 | | 26 | 26 | 26 | | 52 | 1 |
| 22 | | | 106 | | 26 | 52 | | 26 | 26 | 1 |
| 23 | | | 106 | | 26 | 52 | | 52 | | 1 |
| 24 | 52 | | | 52 | — | | 52 | | 52 | 1 |
| 25 | | | | 242-tone RU empty (with zero users) | | | | | | 1 |
| 26 | | | 106 | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2*996 | | | | | 8 |
| 59 | 26 | 26 | 26 | 26 | 26 | 52 + 26 | | | 26 | 1 |
| 60 | 26 | | 26 + 52 | | 26 | 26 | 26 | | 26 | 1 |
| 61 | 26 | | 26 + 52 | | 26 | 26 | | 52 | | 1 |

TABLE 6-continued

| Indices | #1 | #2 | #3 | #4 | #5 | #6 | #7 | #8 | #9 | Number of entries |
|---|---|---|---|---|---|---|---|---|---|---|
| 62 | 26 |    | 26 + 52 |    | 26 | 52 | 26 | 26 |    | 1 |
| 63 | 26 | 26 | 52 |    | 26 |    | 52 + 26 | 26 |    | 1 |
| 64 | 26 |    | 26 + 52 |    | 26 |    | 52 + 26 | 26 |    | 1 |
| 65 | 26 |    | 26 + 52 |    | 26 | 52 |    | 52 |    | 1 |

TABLE 7

| | | | | | | | | | |
|---|---|---|---|---|---|---|---|---|---|
| 66 | 52 |    | 26 | 26 | 26 | 52 + 26 |    | 26 |    | 1 |
| 67 | 52 |    | 52 |    | 26 | 52 + 26 |    | 26 |    | 1 |
| 68 | 52 |    |    | 52 + 26 |    | 52 |    | 52 |    | 1 |
| 69 | 26 | 26 | 26 | 26 |    | 26 + 106 |    |    |    | 1 |
| 70 | 26 |    | 26 + 52 |    | 26 |    | 106 |    |    | 1 |
| 71 | 26 | 26 | 52 |    |    | 26 + 106 |    |    |    | 1 |
| 72 | 26 |    | 26 + 52 |    |    | 26 + 106 |    |    |    | 1 |
| 73 | 52 |    | 26 | 26 |    | 26 + 106 |    |    |    | 1 |
| 74 | 52 |    | 52 |    |    | 26 + 106 |    |    |    | 1 |
| 75 |    | 106 + 26 |    |    | 26 | 26 | 26 | 26 |    | 1 |
| 76 |    | 106 + 26 |    |    | 26 | 26 |    | 52 |    | 1 |
| 77 |    | 106 + 26 |    |    | 52 |    | 26 | 26 |    | 1 |
| 78 |    | 106 |    | 26 |    | 52 + 26 |    | 26 |    | 1 |
| 79 |    | 106 + 26 |    |    |    | 52 + 26 |    | 26 |    | 1 |
| 80 |    | 106 + 26 |    |    | 52 |    |    | 52 |    | 1 |
| 81 |    | 106 + 26 |    |    |    | 106 |    |    |    | 1 |
| 82 |    | 106 |    |    |    | 26 + 106 |    |    |    | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1x STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 ns may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \qquad \text{<Equation 1>}$$

The EHT-STF for the 20 MHz PPDU may be configured based on the following equation. The following example may be a first type (i.e., 1x STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112:16:112)=\{M\}*(1+j)/\text{sqrt}(2)$$

$$EHT\text{-}STF(0)=0 \qquad \text{<Equation 2>}$$

The EHT-STF for the 40 MHz PPDU may be configured based on the following equation. The following example may be the first type (i.e., 1x STF) sequence.

$$EHT\text{-}STF(-240:16:240)=\{M,0,-M\}*(1+j)/\text{sqrt}(2) \qquad \text{<Equation 3>}$$

The EHT-STF for the 80 MHz PPDU may be configured based on the following equation. The following example may be the first type (i.e., 1x STF) sequence.

$$EHT\text{-}STF(-496:16:496)=\{M,1,-M,0,-M,1,-M\}* \\ (1+j)/\text{sqrt}(2) \qquad \text{<Equation 4>}$$

The EHT-STF for the 160 MHz PPDU may be configured based on the following equation. The following example may be the first type (i.e., 1x STF) sequence.

$$EHT\text{-}STF(-1008:16:1008)=\{M,1,-M,0,-M,1,-M,0, \\ -M,-1,M,0,-M,1,-M\}*(1+j)/\text{sqrt}(2) \qquad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496{:}16{:}496)=\{-M,-1,M,0,-M,1,-M\}*(1+j)/\text{sqrt}(2) \quad <\text{Equation 6}>$$

Equation 7 to Equation 11 below relate to an example of a second type (i.e., 2×STF) sequence.

$$EHT\text{-}STF(-120{:}8{:}120)=\{M,0,-M\}*(1+j)/\text{sqrt}(2) \quad <\text{Equation 7}>$$

The EHT-STF for the 40 MHz PPDU may be configured based on the following equation.

$$EHT\text{-}STF(-248{:}8{:}248)=\{M,-1,-M,0,M,-1,M\}*(1+j)/\text{sqrt}(2)$$

$$EHT\text{-}STF(-248)=0$$

$$EHT\text{-}STF(248)=0 \quad <\text{Equation 8}>$$

The EHT-STF for the 80 MHz PPDU may be configured based on the following equation.

$$EHT\text{-}STF(-504{:}8{:}504)=\{M,-1,M,-1,-M,-1,M,0,-M,1,M,1,-M,1,-M\}*(1+j)/\text{sqrt}(2) \quad <\text{Equation 9}>$$

The EHT-STF for the 160 MHz PPDU may be configured based on the following equation.

$$EHT\text{-}STF(-1016{:}16{:}1016)=\{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$EHT\text{-}STF(-8)=0, EHT\text{-}STF(8)=0,$$

$$EHT\text{-}STF(-1016)=0, EHT\text{-}STF(1016)=0 \quad <\text{Equation 10}>$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504{:}8{:}504)=\{-M,1,-M,1,M,1,-M,0,-M,1,M,1,-M,1,-M\}*(1+j)/\text{sqrt}(2)$$

$$EHT\text{-}STF(-504)=0,$$

$$EHT\text{-}STF(504)=0 \quad <\text{Equation 11}>$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
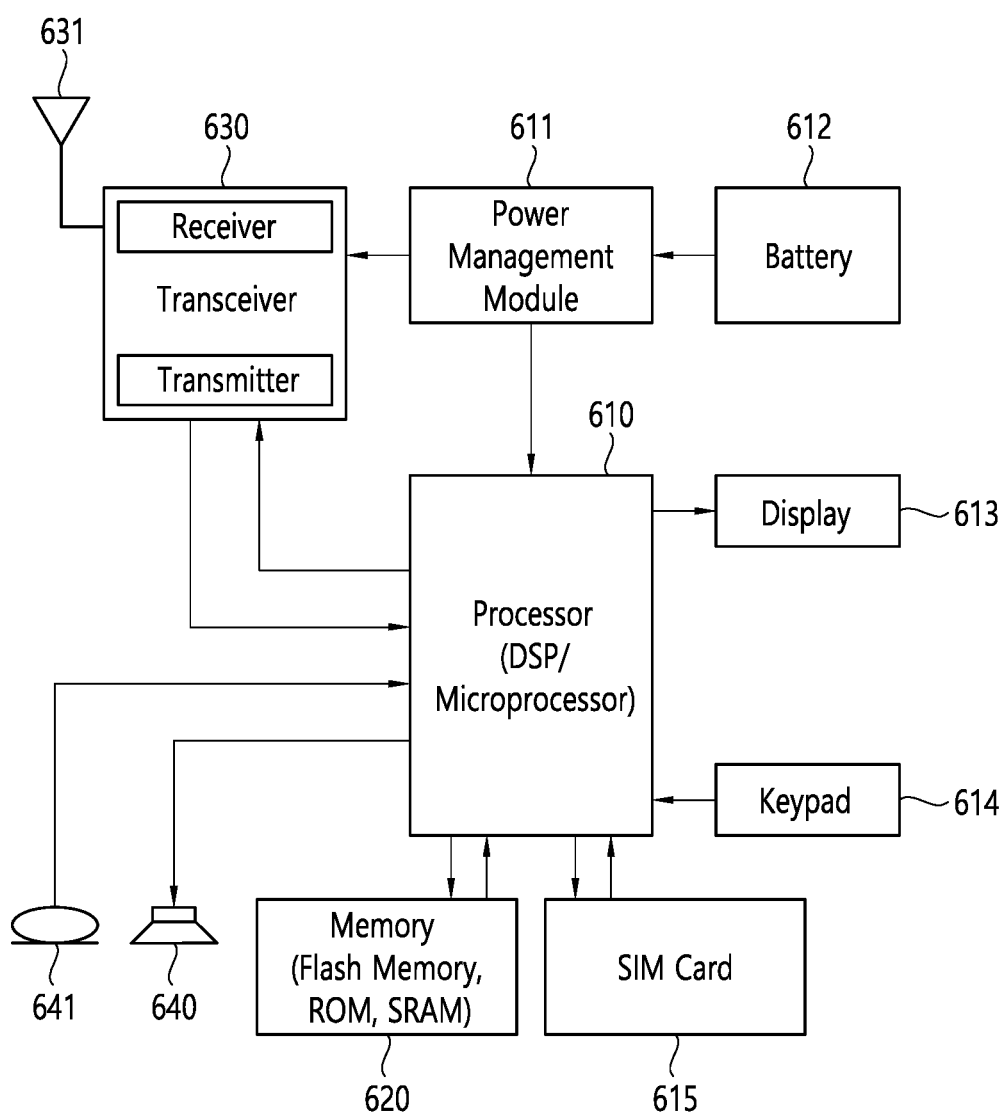
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
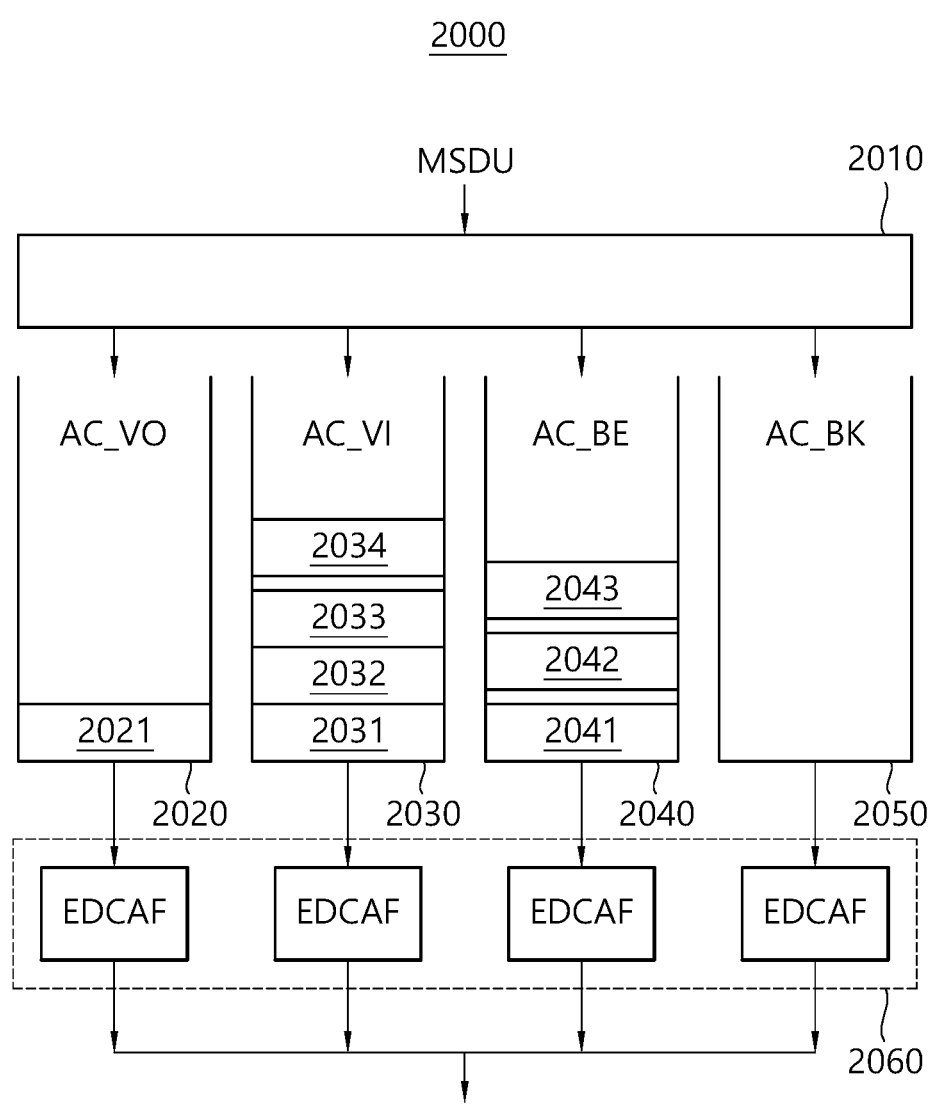
FIG. 20 is a diagram illustrating EDCA-based channel access method.

FIG. 20 is a diagram illustrating EDCA-based channel access method. In a wireless LAN system, a STA may perform channel access according to a plurality of user priorities defined for an enhanced distributed channel access (EDCA).

Specifically, for transmitting a plurality of quality of service (QoS) data frames based on a plurality of user priorities, four access categories (AC) (AC_BK (background), AC_BE (best effort), AC_VI (video), AC_VO (voice)) could be defined.

The STA may receive traffic data (for example, MAC service data unit (MSDU)) having a pre-configured user priority from a higher layer.

For example, in order to determine the transmission order of MAC frames to be transmitted by the STA, a differential value may be configured for each traffic data in the user priority. The user priority may be mapped to each access category (AC) in which traffic data is buffered in a manner as shown in Table 8 below.

TABLE 8

| Priority | User Priority | Access Category (AC) |
|---|---|---|
| Lower | 1 | AC_BK |
|  | 2 | AC_BK |
|  | 0 | AC_BE |

TABLE 8-continued

| Priority | User Priority | Access Category (AC) |
|---|---|---|
|  | 3 | AC_BE |
|  | 4 | AC_VI |
|  | 5 | AC_VI |
|  | 6 | AC_VO |
| Higher | 7 | AC_VO |

In this specification, the user priority may be understood as a traffic identifier (hereinafter, 'TID') indicating characteristics of traffic data.

Referring to Table 8, traffic data having a user priority (that is, TID) of '1' or '2' may be buffered in the AC_BK type transmission queue 2050. Traffic data having a user priority (that is, TID) of '0' or '3' may be buffered in the AC_BE type transmission queue 2040.

Traffic data having a user priority (that is, TID) of '4' or '5' may be buffered in the AC_VI type transmission queue 2030. Traffic data having a user priority (that is, TID) of '6' or '7' may be buffered in the AC_VO type transmission queue 2020.

Instead of DIFS (DCF interframe space), CWmin, CWmax, which are parameters for backoff operation/procedure based on the existing distributed coordination function (DCF), EDCA parameter, configured for the backoff operation/procedure of the STA performing EDCA, AIFS (arbitration interframe space) [AC], CWmin [AC], CWmax [AC] and TXOP limit [AC] may be used.

A difference in transmission priority between ACs may be implemented based on the differential EDCA parameter set. The default values of the EDCA parameter sets (that is, AIFS[AC], CWmin[AC], CWmax[AC], TXOP limit[AC]) corresponding to each AC are exemplarily shown in Table 9 below. Specific values in Table 9 could be configured differently from the following.

TABLE 9

| AC | CWmin [AC] | CWmax [AC] | AIFS [AC] | TXOP limit [AC] |
|---|---|---|---|---|
| AC_BK | 31 | 1023 | 7 | 0 |
| AC_BE | 31 | 1023 | 3 | 0 |
| AQ_VI | 15 | 31 | 2 | 3.008 ms |
| AC_VO | 7 | 15 | 2 | 1.504 ms |

The EDCA parameter set for each AC may be configured as a default value or may be included in a beacon frame and transmitted from an access point (AP) to each STA. The smaller the AIFS[AC] and CWmin[AC] values, the higher the priority. As a result, channel access delay is shortened, allowing more bandwidth to be used in a given traffic environment.

The EDCA parameter set may include information on channel access parameters (for example, AIFS [AC], CWmin[AC], CWmax[AC]) for each AC.

The backoff operation/procedure for EDCA may be performed based on EDCA parameter set individually configured to four ACs included in each STA. Appropriate configuring of EDCA parameter values, which define different channel access parameters for each AC, can optimize network performance and increase the transmission effect due to traffic priority.

Therefore, the AP of the WLAN system must perform overall management and adjustment functions for EDCA parameters to ensure fair media access to all STAs participating in the network.

Referring to FIG. 20, one STA (or AP) 2000 may include a virtual mapper 2010, a plurality of transmission queues 2020 to 2050, and a virtual collision handler 2060. The virtual mapper 2010 of FIG. 20 may serve to map the MSDU received from the logical link control (LLC) layer to the transmission queue corresponding to each AC according to Table 1 above.

The plurality of transmission queues 2020 to 2050 of FIG. 20 may serve as individual EDCA contention entities for wireless medium access within one STA (or AP).

Figure 21:
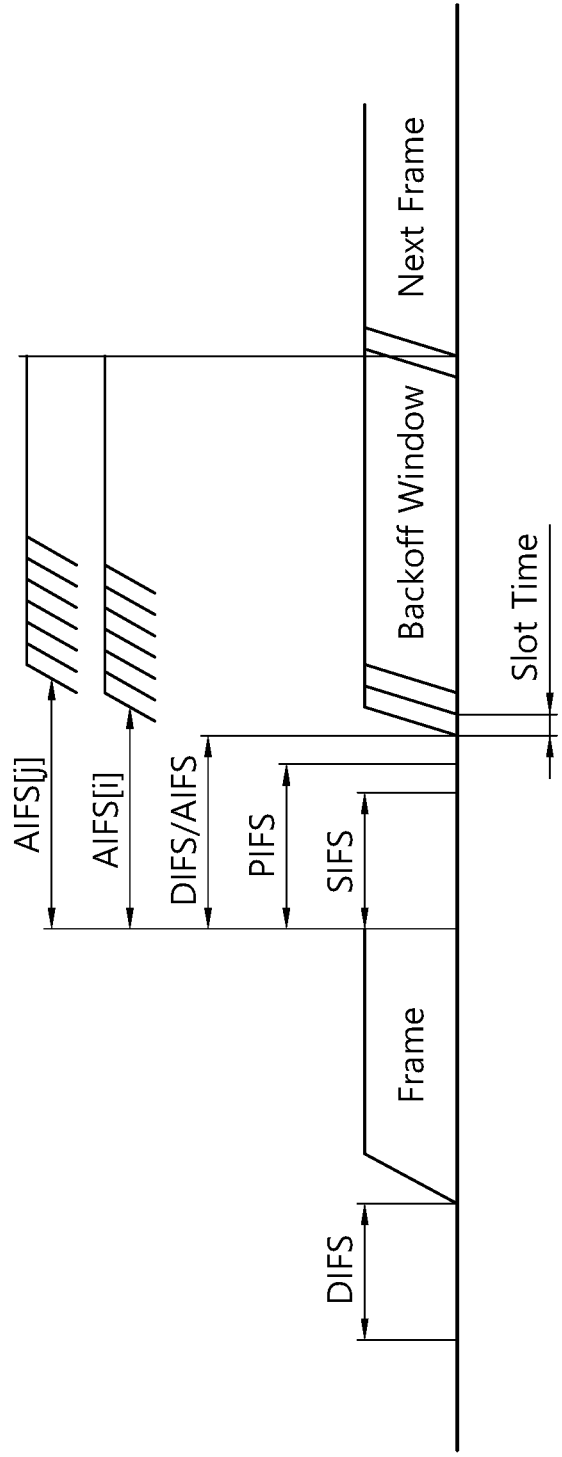
FIG. 21 is a conceptual diagram illustrating a backoff operation/procedure of EDCA.

FIG. 21 is a conceptual diagram illustrating a backoff operation/procedure of EDCA.

A plurality of STAs may share a wireless medium based on a DCF, which is a contention-based function. The DCF may use CSMA/CA to handle collisions between STAs.

In the channel access scheme using a DCF, if the medium is not used during a DCF inter frame space (DIFS) (that is, the channel is idle), the STA may transmit an internally determined MPDU. The DIFS is a type of time length used in the IEEE standard, and the IEEE standard uses various time intervals such as slot time, a Short Inter-frame Space (SIFS), a PCF Inter-frame Space (PIFS), a DIFS, and an arbitration interframe space (AIFS). The specific value of each time interval can be configured in various ways, but in general, the length is configured to become longer in the order of slot time, a SIFS, a PIFS, a DIFS, and an AIFS.

If it is determined by the STA's carrier sensing mechanism that the wireless medium is used by another STA (that is, the channel is busy), the STA may determine the size of a contention window (hereinafter, 'CW') and perform a backoff operation/procedure.

In order to perform the backoff operation/procedure, each STA may configure a backoff counter with a backoff value arbitrarily selected within the contention window (CW).

Each STA may perform a backoff operation/procedure for channel access by counting down the backoff window in units of slot times. A STA that has selected the relatively shortest backoff window from a plurality of STAs may acquire a transmission opportunity (hereinafter, 'TXOP'), which is a right to occupy the medium.

During the time period for the transmission opportunity (TXOP), the remaining STAs may stop the countdown operation. The remaining STAs may wait until the time period for the transmission opportunity (TXOP) ends. After the time period for the transmission opportunity (TXOP) ends, the remaining STAs may resume the stopped countdown operation to occupy the wireless medium.

According to such a DCF-based transmission method, a collision that may occur when a plurality of STAs transmit frames at the same time can be prevented. However, the channel access scheme using the DCF has no concept of transmission priority (that is, user priority). That is, when the DCF is used, the quality of service (QoS) of traffic to be transmitted by the STA cannot be guaranteed.

To solve this problem, a hybrid coordination function (hereinafter, 'HCF'), which is a new coordination function, is defined in 802.11e. The newly defined HCF has improved performance than the channel access performance of the existing DCF. For the purpose of QoS improvement, HCF may use two channel access techniques, which are an HCF controlled channel access (HCCA) of polling technique and a contention-based enhanced distributed channel access (EDCA) together.

Referring to FIG. 21, it is assumed that the STA performs EDCA for transmission of traffic data buffered to the STA. Referring to Table 8, user priorities set for each traffic data may be differentiated into 8 levels.

Each STA may include an output queue of 4 types (AC_BK, AC_BE, AC_VI, AC_VO) mapped with the user priorities of 8 levels of Table 8.

The IFS such as a SIFS, a PIFS, and a DIFS will be further described as follows.

An IFS may be determined according to a property specified by the physical layer of the STA regardless of the bit rate of the STA. In the interframe space (IFS), except for an AIFS, a preconfigured value for each physical layer may be fixedly used.

An AIFS can be configured to values corresponding to 4 types of transmission queues mapped with user priorities as shown in Table 9.

A SIFS has the shortest time gap among the above-mentioned IFSs. Accordingly, it can be used when it is necessary for the STA occupying the wireless medium to maintain the occupation of the medium without interference by other STAs in a period in which a frame exchange sequence is performed.

That is, by using the smallest gap between transmissions in the frame exchange sequence, priority can be given for completing the ongoing frame exchange sequence. In addition, a STA that accesses the wireless medium using SIFS may start transmission immediately from the SIFS boundary without determining whether the medium is busy.

The duration of the SIFS for a specific physical (PHY) layer may be defined by the aSIFSTime parameter. For example, in the physical layer (PHY) of IEEE 802.11a, IEEE 802.11g, IEEE 802.11n, and IEEE 802.11ac standards, the SIFS value is 16 μs.

A PIFS may be used to provide the STA with the highest priority after a SIFS. That is, the PIFS can be used to obtain priority for accessing the wireless medium.

A DIFS may be used by a STA that transmits a data frame (MPDU) and a management frame (MPDU (Mac Protocol Data Unit) based on a DCF. If it is determined that the medium is idle through a carrier sense (CS) mechanism after the received frame and the backoff time have expired, the STA may transmit the frame.

Figure 22:
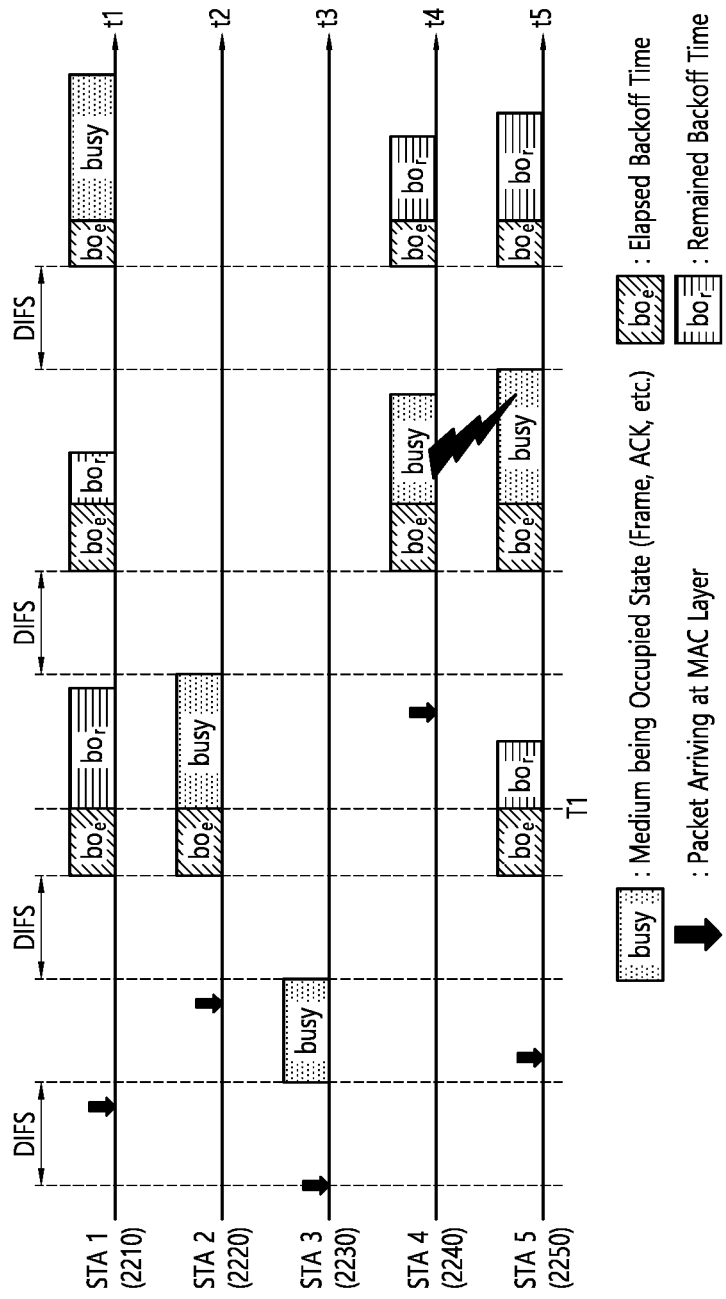
FIG. 22 is a diagram for explaining a back-off operation.

FIG. 22 is a diagram for explaining a back-off operation.

Each STA 2210, 2220, 2230, 2240, and 2250 may individually select a backoff value for a backoff operation/procedure. In addition, each STA may attempt transmission after waiting for a time (that is, a backoff window) indicated in units of slot time for the selected backoff value. In addition, each STA may count down the backoff window in units of a slot time. A countdown operation for channel access to the wireless medium may be performed individually by each STA.

The time corresponding to the backoff window may be referred to as a random backoff time ($Tb[i]$). In other words, each STA may individually configure the backoff time ($Tb[i]$) in the backoff counter of each STA.

Specifically, the backoff time $Tb[i]$ may be a pseudo-random integer value, and may be calculated based on Equation 12 below.

$$Tb[i] = \text{Random}(i) * \text{SlotTime} \qquad \text{<Equation 12>}$$

Random(i) in Equation 12 is a function that uses a uniform distribution and generates a random integer between 0 and CW[i]. CW[i] may be understood as a contention window selected between a minimum contention window (CWmin[i]) and a maximum contention window (CWmax[i]). The minimum contention window (CWmin[i]) and the maximum contention window (CWmax[i]) may correspond to the default values CWmin[AC] and CWmax[AC] of Table 9.

In the initial channel access, the STA may set CW[i] to CWmin[i] and select an arbitrary integer between 0 and CWmin[i] through Random(i). In this embodiment, any integer selected may be referred to as a backoff value.

i may be understood as a user priority of traffic data. i in Equation 12 may be understood to correspond to any one of AC_VO, AC_VI, AC_BE, or AC_BK according to Table 8.

The slot time of Equation 12 may be used to provide sufficient time so that the preamble of the transmitting STA can be sufficiently detected by the neighboring STA. The slot time of Equation 12 may be used to define the aforementioned PIFS and DIFS. For example, the slot time may be 9 µs.

For example, when the user priority (i) is '7', the initial backoff time (Tb[AC_VO]) for the AC_VO type transmission queue may be a time of a backoff value selected between 0 and CWmin[AC_VO], being expressed in units of the slot time.

When a collision between STAs occurs according to the backoff operation/procedure (or when an ACK frame for a transmitted frame is not received), the STA may calculate the increased backoff time (Tb[i]') based on Equation 13 below.

$$CWnew[i]((CWold[i]+1)*PF)-1 \qquad \text{<Equation 13>}$$

Referring to Equation 13, the new contention window (CWnew[i]) may be calculated based on the previous window (CWold[i]). '*' may mean an operator for multiplication. The PF value of Equation 13 may be calculated according to a procedure defined in the IEEE 802.11e standard. For example, the PF value of Equation 13 may be set to '2'.

In this embodiment, the increased backoff time (Tb[i]') may be understood as a time of an arbitrary integer (that is, a backoff value) selected between 0 and the new contention window (CWnew[i]), being expressed in units of the slot time.

The CWmin[i], CWmax[i], AIFS[i] and PF values mentioned in FIG. 22 may be signaled from the AP through a QoS parameter set element, that is a management frame. The CWmin[i], CWmax[i], AIFS[i], and PF values may be preconfigured values by the AP and the STA.

Referring to FIG. 22, when a specific medium is changed from an occupied (occupy or busy) state to an idle state, a plurality of STAs may attempt data (or frame) transmission. At this time, as a method to minimize collision between STAs, each STA may select a backoff time (Tb[i]) of Equation 12 and attempt transmission after waiting for a corresponding slot time.

When the backoff operation/procedure is started, each STA may count down the individually selected backoff counter time in units of the slot time. Each STA may continuously monitor the medium during the countdown.

If the wireless medium is monitored as being occupied, the STA may stop counting down and wait. If the wireless medium is monitored as idle, the STA may resume the countdown.

Referring to FIG. 22, when a frame for the third STA 2230 arrives at the MAC layer of the third STA 2230, the third STA 2230 may check whether the medium is idle during a DIFS. Subsequently, if it is determined that the medium is idle during the DIFS, the third STA 2230 may transmit a frame.

While the frame is transmitted from the third STA 2230, the remaining STAs may check the media occupancy status and wait for the frame transmission period. A frame may arrive at each MAC layer of the first STA 2210, the second STA 2220, and the fifth STA 2250. If the medium is identified as idle, each STA may count down the individual backoff time selected by each STA after waiting by the DIFS.

Referring to FIG. 22, a case in which the second STA 2220 selects the smallest backoff time and the first STA 2210 selects the largest backoff time is shown. It illustrates that, after the backoff operation/procedure for the backoff time selected by the second STA 2220 is completed, at the time of starting frame transmission (T1), the remaining backoff time of the fifth STA 2250 is shorter than the remaining backoff time of the first STA 2210.

When the medium is occupied by the second STA 2220, the first STA 2210 and the fifth STA 2250 may suspend the backoff operation/procedure and wait. Subsequently, when the media occupation of the second STA 2220 is terminated (that is, the medium is idle again), the first STA 2210 and the fifth STA 2250 may wait for the DIFS.

Then, the first STA 2210 and the fifth STA 2250 may resume the backoff operation/procedure based on the stopped remaining backoff time. In this case, since the remaining backoff time of the fifth STA 2250 is shorter than the remaining backoff time of the first STA 2210, the fifth STA 2250 may complete the backoff operation/procedure before the first STA 2210.

Meanwhile, referring to FIG. 22, when the medium is occupied by the second STA 2220, a frame for the fourth STA 2240 may reach the MAC layer of the fourth STA 2240. When the medium becomes idle, the fourth STA 2240 may wait for the DIFS. Then, the fourth STA 2240 may count down the backoff time selected by the fourth STA 2240.

Referring to FIG. 22, the remaining backoff time of the fifth STA 2250 may coincidentally coincide with the backoff time of the fourth STA 2240. In this case, a collision may occur between the fourth STA 2240 and the fifth STA 2250. When a collision between STAs occurs, neither the fourth STA 2240 nor the fifth STA 2250 may receive an ACK, and data transmission may fail.

Accordingly, the fourth STA 2240 and the fifth STA 2250 may separately calculate a new contention window CWnew[i] according to Equation 13 above. Then, the fourth STA 2240 and the fifth STA 2250 may separately count down the backoff time calculated according to Equation 13 above.

Meanwhile, when the medium is occupied due to the transmission of the fourth STA 2240 and the fifth STA 2250, the first STA 2210 may stand by. Then, when the medium becomes idle, the first STA 2210 may resume counting the backoff after waiting for the DIFS. When the remaining backoff time of the first STA 2210 has elapsed, the first STA 2210 may transmit a frame.

Hereinafter, a method for performing low-latency communication may be described. Low-latency communication may refer to technology for supporting time delay-sensitive traffic (that is, low-latency traffic). The time delay may mean latency defined in the IEEE 802.11ax standard.

For example, the time delay (that is, latency) may mean a time from a time point at which a frame is received by the queue of the MAC layer to a time point at which the frame is deleted from the queue of the MAC layer. Specifically, the frame may come into the queue of the MAC layer of the transmitting STA (for example, AP). Thereafter, the frame may be transmitted through the PHY layer of the transmitting STA. The frame may be successfully received by the receiving STA. The transmitting STA may receive an ACK/Block ACK frame, or the like from the receiving STA. The transmitting STA may delete the frame from the queue of the MAC layer. Here, the time delay may mean a time from when a frame is received by the queue of the MAC layer until the frame is deleted from the queue of the MAC layer. Hereinafter, for the convenience of description, the transmitting STA may be referred to as an access point (AP). Also, the receiving STA may be referred to as a STA.

Various technologies may be required to support time delay-sensitive traffic. For example, a method for transmitting a low latency frame, a method for low latency retransmission, a method for a low latency channel contention, or a method for low latency signaling may be required.

As an example, the method for the low latency frame transmission (or technology for low latency communication) may mean technology for reducing the time delay when transmitting a data frame. As another example, the method for low latency retransmission may refer to a technique for reducing a time delay when the data frame is retransmitted, if transmission of the data frame fails. As another example, the method for low latency channel contention may refer to a technique for reducing the time by improving the channel contention method. As another example, the method for low latency signaling may refer to a signaling technology for exchanging information related to low latency communication between the STA and the AP to perform low latency communication.

Hereinafter, the present specification may propose various technologies for supporting traffic sensitive to the above-described time delay. In addition, the traffic may include various types of traffic. For example, traffic may be divided into at least two types of traffic. As an example, the first traffic may be traffic sensitive to time delay. The second traffic may be traffic that is not sensitive to time delay. Classification of traffic according to time delay may be only one example, and classification criteria may be set in various ways. For example, the classification criteria may include at least one-time delay, whether it is for machine-type communication, or importance.

Hereinafter, traffic described in this specification may refer to a type of traffic different from conventional traffic. For example, the traffic described below may mean traffic sensitive to time delay.

Figure 23:
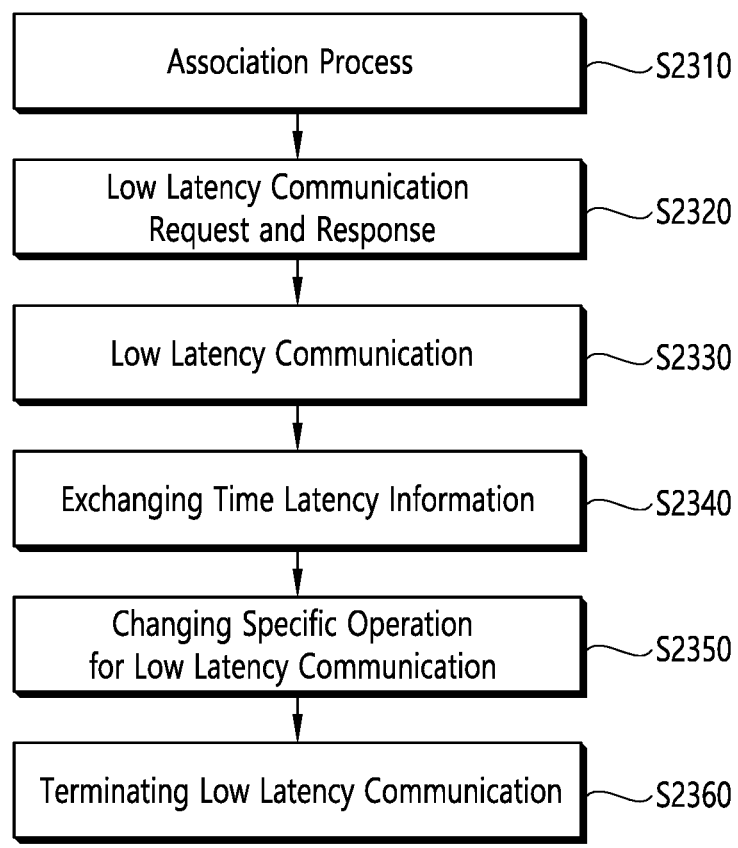
FIG. 23 is a flowchart related to an operation for performing low latency communication.

FIG. 23 is a flowchart related to an operation for performing low latency communication.

Referring to FIG. 23, the AP and the STA may perform steps S2310 to S2360. Some of the steps described above may not be essential. Accordingly, some steps may be omitted. In addition, since the order of the above-described steps is an example, the order of performing each step may vary. In addition, only one of the above-described steps may have an independent technical meaning.

In step S2310, the AP and the STA may perform an association process. Specifically, the AP and the STA may exchange information about the low-latency function. Information on the low latency function may include information on whether or not to support the low latency communication function.

In step S2320, the AP and the STA may transmit/receive a low latency communication request frame and transmit/receive a low latency communication response frame. For example, uplink traffic may occur in the STA. The STA may request the AP to perform low latency communication based on the uplink traffic. That is, the STA may transmit a low latency communication request frame to the AP. AP may transmit a low latency communication response frame to the STA based on the low latency communication request frame.

As another example, downlink traffic may be generated from the AP. The AP may transmit information to the STA that low latency communication will be performed, based on the downlink traffic. That is, the AP may transmit a low latency communication request frame to the STA. The STA may transmit a low latency communication response frame to the AP, based on the low latency communication request frame. In the case of downlink traffic, even when the STA does not transmit a low latency communication response frame to the AP, the AP and the STA may perform low latency communication.

In step S2330, the AP and the STA may perform low-latency communication. The AP and the STA may transmit/receive traffic sensitive to time delay (that is, low-latency traffic).

In step S2340, the AP and the STA may exchange time latency information (or information on time latency). The AP and the STA may exchange time latency information of current traffic while low latency communication is performed. For example, the AP and the STA may exchange the current traffic time latency status. The AP and the STA may periodically exchange time latency information, alternatively, the AP and the STA may exchange time latency information whenever it is necessary.

In step S2350, the AP and the STA may change a specific operation for low-latency communication. The AP and the STA may change or maintain a specific operation for low-latency communication based on the current time latency.

In step S2360, the AP and the STA may terminate the low latency communication. Based on all the traffic transmitted through the low latency communication is transmitted, the AP and the STA may request and respond to terminate the low latency communication.

Hereinafter, specific operations of the AP and the STA may be described in relation to steps of FIG. 23.

(1) Association Process for Low-Latency Communication

The following technical characteristics may be related to step S2310. For example, the following technical features may be used in the process of performing step S2310. Alternatively, the following technical features may be performed in steps other than step S2310.

The AP supporting the low-latency communication function may include information on whether the low-latency communication function is supported in the Beacon frame or the Probe response frame. Thereafter, the AP may transmit a Beacon frame or a Probe response frame. Information on whether to support the low-latency communication function may be included in the EHT Capability information element field.

FIG. 24 shows an example of an EHT Capability information element field configuration.

Referring to FIG. 24, the EHT Capability information element field 2400 may include a Multi-band support field 2410, a Low Latency support field 2420, a 16 Stream support field 2430, or a 320 MHz support field 2440. The EHT Capability information element field may include capability information for main technologies applied in EHT. The specific field names of the detailed fields included in the EHT Capability information element field 2400 and the EHT Capability information element field 2400 may be changed.

For example, the Low Latency support field 2420 may include capability information for a technology related to low-latency communication of the STA or AP. For example, the STA may transmit a frame (or PPDU) including the EHT Capability information element field 2400 to the AP. The STA may transmit information that it can support low-latency communication to the AP through the EHT Capability information element field 2400. In addition, the AP may also transmit information that it can support low-latency communication to the STA through the EHT Capability information element field 2400 to the STA.

(2) Low-Latency Communication Request and Response Process

The following technical features may be related to step S2320. For example, the following technical features may be used in the process of performing step S2320. Alternatively, the following technical features may be performed in steps other than step S2320.

When traffic (for example, traffic sensitive to time delay) occurs, the STA and the AP may exchange information about the traffic. For example, the STA and the AP may exchange information on the traffic through a Traffic Specification (TSPEC) element field. In addition, the STA and the AP may exchange information about the traffic, and exchange information related to low-latency communication technology together.

FIG. 25 shows an example of the TSPEC element field configuration.

Referring to FIG. 25, at least one field among subfields of the TSPEC element field 2500 may be used to exchange information about traffic. For example, the TSPEC element field 2500 may include a plurality of subfields for information about traffic. A field related to a time delay among a plurality of subfields for the information on the traffic may be a Delay Bound field. The Delay Bound field may include information about an allowable maximum time delay value. Additionally, the Delay Bound field may further include information on average Delay or worst-case Delay.

According to an embodiment, information about traffic may be included in a field other than the Delay Bound field. For example, the TS Info field may include information about traffic. As an example, 1 bit of the Traffic Stream (TS) Info field may include information about traffic.

According to an embodiment, a Mean Delay field may be additionally defined in addition to the Delay Bound field. The Mean Delay field may include information on both the maximum allowable time delay value and the average time delay value.

According to an embodiment, when transmitting and receiving traffic sensitive to time delay, it is important to consider the jitter value of the time delay. Accordingly, in FIG. 26, a method of adding a field including information on a time delay jitter value to the TSPEC element field may be proposed. Additionally, a method of adding a field including packet loss requirement information to the TSPEC element field may be proposed.

FIG. 26 shows another example of the TSPEC element field configuration.

Referring to FIG. 26, the TSPEC element field 2600 may further include a Delay Jitter field 2610 and/or a Required Packet Loss field 2620 in addition to the TSPEC element field 2500 of FIG. 25.

Specifically, in traffic sensitive to time delay (That is, traffic where latency is important), Delay Bound information (that is, the maximum allowable time delay value) of the TSPEC field 2600 may be an important indicator. In addition, the delay jitter value required for the traffic and the probability that a specific packet is lost after the maximum allowable time delay value may also be important performance indicators for the traffic. Accordingly, the Delay Jitter value and Required Packet Loss value of the traffic may be added to the TSPEC element field 2610. That is, the Delay Jitter field 2610 may include information about a Delay Jitter value. The Required Packet Loss field 2620 may include information about a Required Packet Loss value. In other words, the Required Packet Loss field 2620 may include information about the probability that a specific packet is lost after the maximum allowable time delay value has passed.

Figure 27:
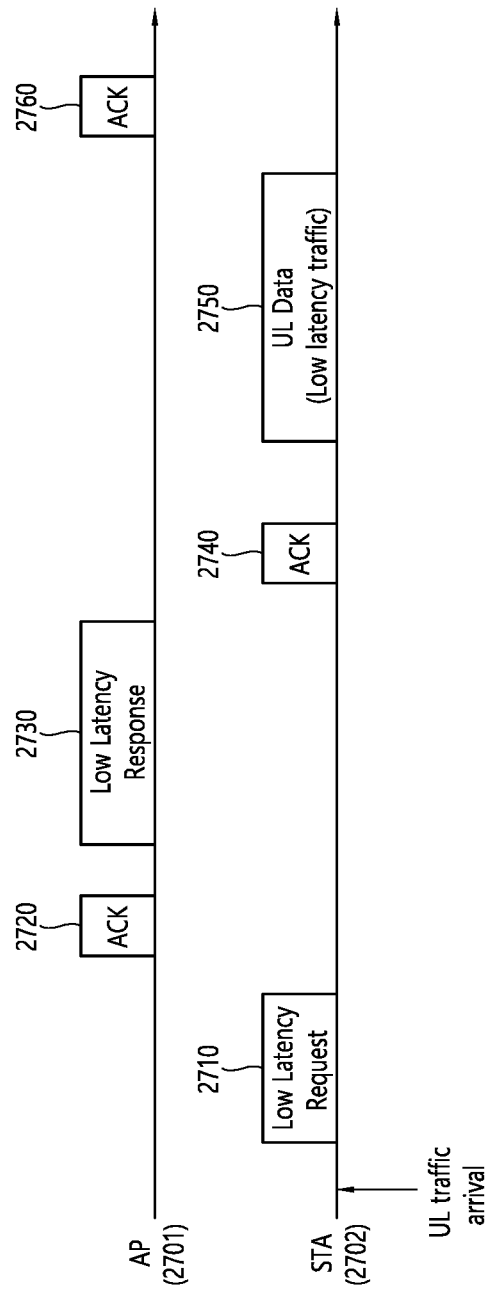
FIG. 27 shows an example of a low-latency communication request and response process.

FIG. 27 shows an example of a low-latency communication request and response process.

Referring to FIG. 27, after the AP 2701 and the STA 2702 exchange information on whether to support the low-latency communication function, low-latency traffic may occur. FIG. 27 illustrates an embodiment when uplink traffic occurs. Even when downlink traffic occurs, the AP 2701 and the STA 2702 may similarly operate.

According to an embodiment, uplink traffic may be generated/arrived at the STA 2702. Thereafter, the STA 2702 may request a low-latency operation through the Low Latency Request frame 2710 including information about traffic. The AP 2701 may receive a Low Latency Request frame 2710 from the STA 2702. The AP 2701 may transmit an ACK frame 2720 to the STA 2702 in response to the Low Latency Request frame 2710.

The AP 2701 may transmit, to the STA 2702, a Low Latency Response frame 2730 including information about low-latency communication to be operated by the STA 2702. The STA 2702 may receive a Low Latency Response frame 2730. The STA 2702 may transmit an ACK frame 2740 to the AP 2701 in response to the Low Latency Response frame 2730.

The AP 2701 and the STA 2702 may perform low-latency communication based on the Low Latency Request frame 2710 and the Low Latency Response frame 2730. According to an embodiment, when downlink traffic occurs, the AP 2701 may transmit a Low Latency Request frame 2710 to the STA 2730. However, the transmission of the Low Latency Response frame 2730 from the STA 2702 may be omitted.

Hereinafter, a technical feature for preferentially transmitting low-latency traffic may be proposed.

Low-latency traffic should be transmitted prior to other traffic. Therefore, in order to preferentially transmit low-latency traffic, a method of using a separate parameter rather than a method of using a separate access category in EDCA may be considered.

In particular, in EDCA, the smaller the AIFSn or CWmin value, the faster the traffic can be transmitted, so the low-latency traffic can be set to have a smaller AIFSn or CWmin value than other traffic. In this case, there is the effect that low-latency traffic can be transmitted faster than other traffic. However, since the AIFSn can be defined only as an integer in the current standard (or standard), the above-described embodiment has a limitation. Accordingly, below, technical features for improving this may be proposed.

Specifically, an Inter Frame Space (IFS) for low-latency traffic (or data) in relation to the IFS in the present specification may be proposed.

Regarding the IFS, the values described below are used in the specification.

1) An AIFS value can be calculated as SIFS+AIFSn*Slot_time. In this case, SIFS may be set to 16 μs, and Slot_time may be set to 9 μs. For example, if AIFSn is 2, the AIFS value is 34 μs, which can be set the same as the existing DIFS, and it is impossible to set it to a value lower than that.

2) According to the current standard, the SIFS is the minimum for the interval between two frames. The SIFS may be used for transmission of ACK (BA) and CTS. For example, the SIFS may mean the shortest waiting delay time.

3) The next value set after the SIFS is a PIFS, which has one slot time longer than the SIFS. The PIFS may be used when transmitting a Beacon frame. In other words, the PIFS may be set long after the SIFS. According to an embodiment, the PIFS may be used in a PCF function that is a contention-free scheme. For example, the PIFS may be used when transmitting a frame of a STA operating based on a PCF.

4) The values set next to the PIFS are a DIFS and an AIFS (when AIFSn=2) in turn. The DIFS and the AIFS may be mainly used for transmission of AC_VO and AC_VI. In other words, the DIFS may be set long after the PIFS. The AIFS may be set longer than the DIFS. According to an embodiment, the DIFS may mean a minimum time to wait from right after a node last used a wireless medium when each node tries to access a wireless medium in a contention-based service. For example, the DIFS may be used when transmitting a frame by a STA operating based on the DCF.

If the AIFSn is set to 2 for AC_VO and AC_VI, it may be difficult to give more transmission priority to low-latency traffic according to the current standard (or standard). To give priority to low-latency traffic, further adjustments may be made by changing the CWmin value. However, since the Backoff value in the CWmin is randomly selected, it cannot be guaranteed to be transmitted reliably before AC_VO or AC_VI, which are low-latency traffic.

Accordingly, in the present specification, a Low Latency IFS (LLIFS) between the PIFS and the DIFS may be defined. In addition, signalings for using LLIFS together with LLIFS may be proposed.

LLIFS may be defined according to Equation 14.

LLIFS=PIFS+Shift_time(0≤Shift_time≤9)[us]  <Equation 14>

Referring to Equation 14, the Shift_time may mean a time added to protect frames transmitted through the PIFS. The AP may determine the value of the Shift_time between 0 and 9.

According to an embodiment, the LLIFS may be set to the same value in all STAs that transmit low-latency traffic within the BSS, or may be set to different values. The AP may determine whether the LLIFS can be configured differently depending on the STA.

Figure 28:
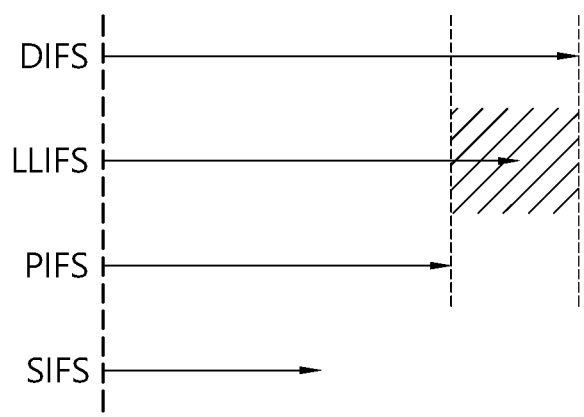
FIG. 28 is a diagram for explaining the length of the LLIFS.

FIG. 28 is a diagram for explaining the length of the LLIFS.

Referring to FIG. 28, the lengths of the LLIFS and other IFSs (for example, a DIFS, a PIFS, or a SIFS) are shown. According to an embodiment, based on the Shift_time value in Equation 14, the LLIFS value may be determined between hatched portions. The LLIFS value may be set longer than a PIFS and shorter than a DIFS. Therefore, when traffic (for example, low-latency traffic) is transmitted using the LLIFS, the traffic may be transmitted later than when the PIFS is used and may be transmitted earlier than when the DIFS is used.

Hereinafter, an embodiment in which the above-described LLIFS is used in EDCA may be described.

A STA in which the EDCA is implemented may have 4 access categories (or queues). For example, as shown in FIG. 20, the four Access Categories may be AC_VO, AC_VI, AC_BE, and AC_BK. In this case, each of the four access categories may have different AIFS and CWmin values.

According to an embodiment, the STA that transmits low-latency traffic may use the LLIFS. When the LLIFS is used in the EDCA, various embodiments may be applied. Hereinafter, two embodiments that can be applied when the LLIFS is used in the EDCA may be described. One or more of the two embodiments may be used depending on the situation.

1) According to the first embodiment, a Low Latency Access Category (or an Access Category for Low Latency) may be separately designated. Accordingly, five or five ACs (or queues) may be implemented in the STA. In other words, a Low Latency Access Category may be additionally defined in AC_VO, AC_VI, AC_BE, and AC_BK.

2) According to the second embodiment, the PPDU included in the low-latency traffic may use AC_VO, AC_VI Queue. However, when the PPDU included in the low-latency traffic is transmitted, the LLIFS rather than the AIFS of AC_VO and AC_VI may be used.

The transmission time of the STA may affect not only the IFS but also the backoff counter. The backoff counter can be arbitrarily selected by the STA in the contention window. In particular, the value of the CWmin selected at the time of first transmission rather than retransmission may be important in the transmission of a frame.

In the conventional standard, when the SIFS or the PIFS is used, the CWmin value may be set to 0. In addition, when the DIFS or the AIFS is used, the AP may transmit information on the CWmin value to the STA through the EDCA Parameter field.

Hereinafter, a technical feature in which the AP variably determines the CWmin of traffic using the LLIFS may be proposed according to circumstances. For example, the CWmin value of traffic using the LLIFS for fast transmission may be set to 0 by default. However, in a situation in which there are two or more STAs using the LLIFS, a collision may occur if the CWmin is set to 0 for both STAs. Accordingly, the AP may set the LLIFS value differently for each STA and transmit the configured information to each STA.

According to an embodiment, the AP may distinguish available transmission times (or LLIFS available periods) for a plurality of STAs. For example, the AP may distinguish available transmission times for two STAs. The AP may transmit information about the available transmission time for each STA. As an example, the AP may set the available transmission time for the first STA and the available transmission time for the second STA. The AP may transmit, to the first STA, information about the available transmission time for the first STA and/or information about the available transmission time for the second STA. The AP may also transmit, to the second STA, information about the available transmission time for the first STA and/or information about the available transmission time for the second STA. The above-described embodiment may be described with reference to FIG. 29.

Figure 29:
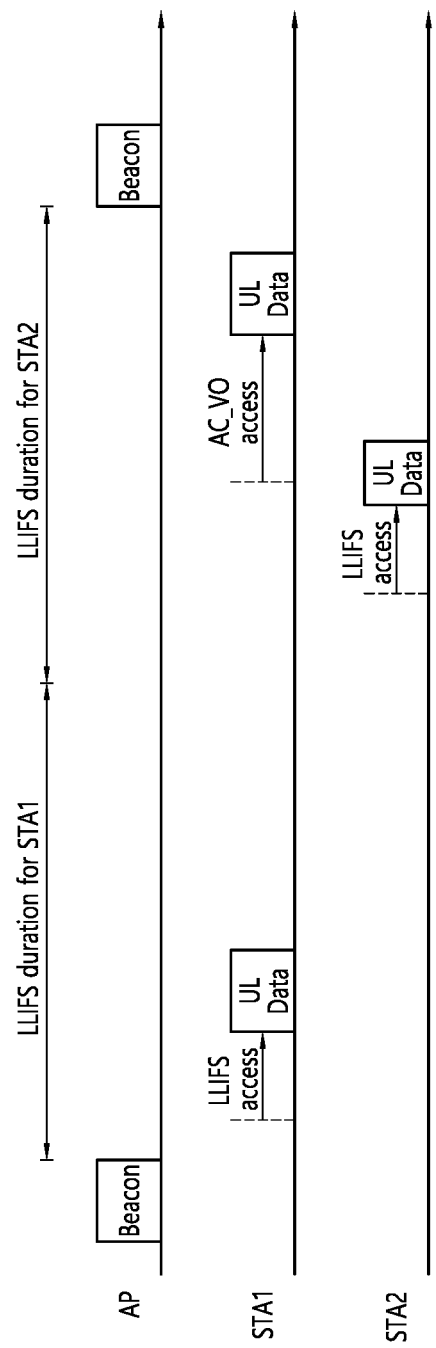
FIG. 29 is a diagram for explaining an example in which a duration, in which the LLIFS is used, is configured.

FIG. 29 is a diagram for explaining an example in which a duration, in which the LLIFS is used, is configured.

Referring to FIG. 29, the AP may transmit, through a Beacon frame, information (or interval information) about a duration that each STA can transmit using the LLIFS. Each STA may transmit a frame (or PPDU) using LLIFS only in each designated duration. STAs may transmit a frame (or PPDU) through a method defined in a conventional standard such as AC_VO outside the designated duration.

For example, STA 1 may transmit a frame using the LLIFS in the duration in which STA 1 can use the LLIFS (hereinafter, referred to as a first duration). In addition, STA 2 may transmit a frame using the LLIFS in the duration in which STA 2 can use the LLIFS (hereinafter, a second duration). In the second period, STA 1 may transmit a frame (or PPDU) through a method defined in a conventional standard such as AC_VO. In the second duration, since STA 2 can use the LLIFS, it is possible to transmit a frame more quickly.

According to an embodiment, the duration in which the LLIFS is used may be allocated in units of beacon periods. An example in which a duration in which the LLIFS is used is allocated in units of beacon periods may be described with reference to FIG. 30.

Figure 30:
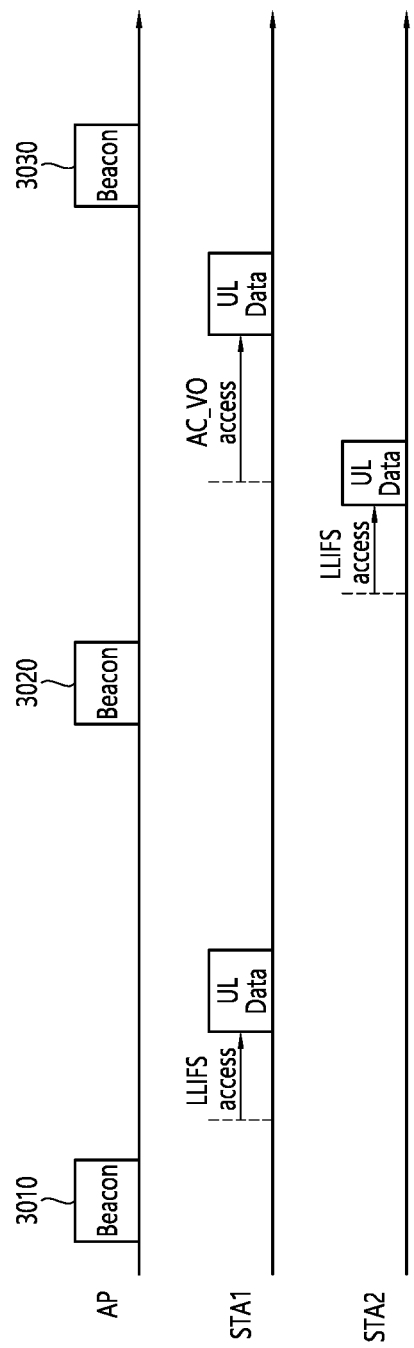
FIG. 30 is a diagram for explaining another example in which a duration, in which the LLIFS is used, is configured.

FIG. 30 is a diagram for explaining another example in which a duration, in which the LLIFS is used, is configured.

Referring to FIG. 30, in the interval between the beacon 3010 and the beacon 3020, STA 1 may transmit a frame using the LLIFS. Also, in the interval between the beacon 3020 and the beacon 3030, STA 2 may transmit a frame using the LLIFS. In the duration between the beacon 3020 and the beacon 3030, STA 1 cannot use the LLIFS, and may transmit a frame (or PPDU) through a method defined in a conventional standard such as AC_VO.

Figure 31:
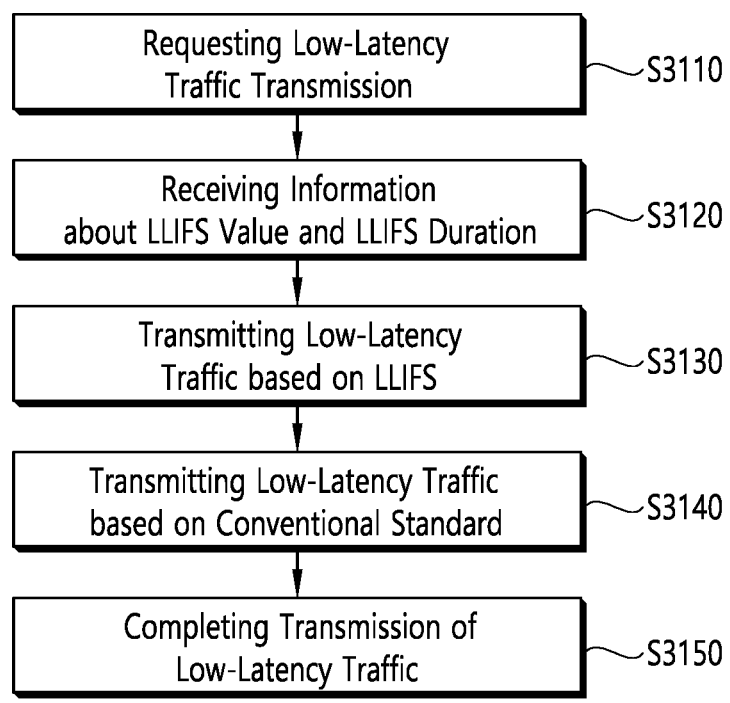
FIG. 31 is a flowchart for explaining an operation of a receiving STA.

FIG. 31 is a flowchart for explaining an operation of a receiving STA.

Referring to FIG. 31, in step S3110, the receiving STA may perform a low-latency traffic transmission request. The receiving STA may transmit information that there is low-latency traffic to transmit to the transmitting STA. For example, low-latency traffic may include time-delay sensitive traffic. For example, low-latency traffic may include data requiring a time latency value less than or equal to a threshold.

In step S3120, the receiving STA may receive information about the LLIFS value and the LLIFS duration. According to an embodiment, the receiving STA may receive information about the LLIFS value from the transmitting STA. The LLIFS value may be set to be greater than the PIFS value and less than the DIFS value. For example, the LLIFS value may be set based on Equation 14 described above.

According to an embodiment, the receiving STA may receive information about the LLIFS duration from the transmitting STA. For example, the transmitting STA may set a duration (that is, LLIFS duration) in which the receiving STA can use the LLIFS. The receiving STA may receive information about the LLIFS duration from the transmitting STA and check the LLIFS duration. The receiving STA may use the LLIFS in the LLIFS duration. The receiving STA may perform channel estimation according to the conventional standard in a duration other than the LLIFS duration.

In step S3130, the receiving STA may transmit low-latency traffic based on the LLIFS. For example, the receiving STA may transmit low-latency traffic using the LLIFS. For example, the receiving STA may transmit low-latency traffic based on the LLIFS within the LLIFS duration. Therefore, the receiving STA may preferentially transmit low-latency traffic than other STAs other than the receiving STA.

According to an embodiment, the receiving STA may transmit low-latency traffic through a separate queue (or access category) for low-latency traffic. A separate queue for low-latency traffic may mean a queue distinct from AC_VO, AC_VI, AC_BE, and AC_BK.

According to an embodiment, the receiving STA may use a conventional queue to transmit low-latency traffic. For example, the receiving STA may use AC_VO and AC_VI to transmit low-latency traffic. However, the receiving STA may use the LLIFS instead of an AIFS of AC_VO and AC_VI. Therefore, the receiving STA may transmit low-latency traffic preferentially over STAs that transmit traffic using AC_VO and AC_VI.

In step S3140, the receiving STA may transmit low-latency traffic based on the conventional standard. For example, the receiving STA may transmit low-latency traffic based on a conventional standard, in addition to the LLIFS duration. When the low-latency traffic is related to video, the receiving STA may perform the EDCA based on the EDCA parameter according to the access category of AC_VO. The receiving STA may transmit low-latency traffic through the EDCA.

In step S3150, the receiving STA may complete the transmission of the low-latency traffic.

Figure 32:
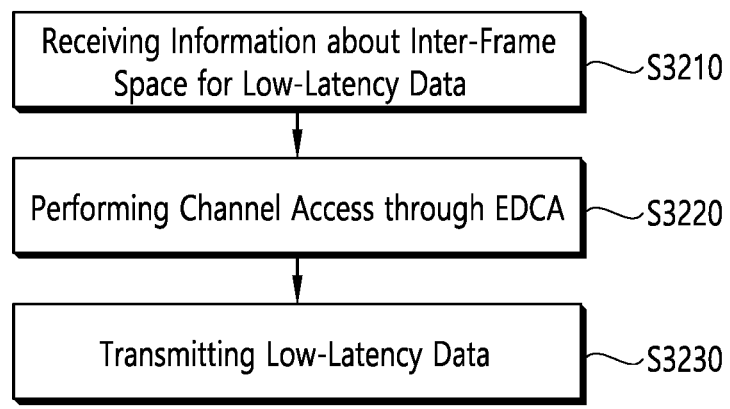
FIG. 32 is a flowchart for explaining another operation of a receiving STA.

FIG. 32 is a flowchart for explaining another operation of a receiving STA.

Referring to FIG. 32, in step S3210, the receiving STA may receive information about the inter-frame space (IFS) for low-latency data (or low-latency traffic). For example, low-latency data may include time-delay sensitive traffic. For example, low-latency data may include data requiring a time delay value less than or equal to a threshold value.

For example, the inter-frame space for the low-latency data may be referred to as a Low Latency Inter-Frame Space (LLIFS).

For example, the inter-frame space for low-latency data may be set to be larger than a Point Coordination Function Inter-frame Space (PIFS) and smaller than a Distributed Inter-Frame Space (DIFS). As an example, the inter-frame space for low-latency data may be determined/configured based on Equation 15.

$$LLIFS=PIFS+Shift\_time \qquad <\text{Equation 15}>$$

Referring to Equation 15, the LLIFS may mean an inter-frame space for the low-latency data. The PIFS may be set to 25 μs. The Shift_time may be set to one of 0 us to 9 μs.

For example, information about the inter frame space (IFS) for low-latency data (or low-latency traffic) may include information about the value of the Shift_time of Equation 15. Accordingly, the receiving STA may check the value of the LLIFS based on the received information on the value of the Shift_time.

In step S3220, the receiving STA may perform channel access through Enhanced Distributed Channel Access (EDCA). According to an embodiment, the receiving STA may perform channel access through EDCA, based on the inter-frame space for low-latency data.

According to an embodiment, the receiving STA may receive information about parameters for EDCA. For example, the information about the parameters for the EDCA may include a CWmin, a CWmax, and a TXOP limit. The CWmin, the CWmax, and the TXOP limit may be set based on the access category. For example, when the LLIFS is used, the value of CWmin may be set to 0. In other words, when the LLIFS is used, the value of the backoff counter may be set to 0 in the initial transmission. Accordingly, when the LLIFS is used, the receiving STA may preferentially obtain a transmission opportunity over other STAs.

According to an embodiment, in the EDCA, a separate queue for low-latency data may be used. For example, the receiving STA may transmit low-latency traffic through a separate queue (or an access category) for low-latency traffic. A separate queue for low-latency traffic may mean a queue distinct from AC_VO, AC_VI, AC_BE, and AC_BK. A separate queue for the low-latency traffic may be referred to as a low-latency queue.

According to an embodiment, the receiving STA may use a conventional queue to transmit low-latency traffic. For example, the receiving STA may use AC_VO and AC_VI to transmit low-latency traffic. However, the receiving STA may use the LLIFS instead of the AIFS of AC_VO and AC_VI. Therefore, the receiving STA may transmit low-latency traffic preferentially over STAs that transmit traffic using AC_VO and AC_VI.

According to an embodiment, the receiving STA may receive, through the beacon frame, information about the first duration in which the inter-frame space for low-latency data is used. The receiving STA within the first duration, based on the inter-frame space for low-latency data, may perform channel access through the EDCA.

For example, the first interval may be set as a beacon interval. In other words, during the interval between the first beacon and the second beacon following the first beacon, the receiving STA may perform the EDCA through the inter-frame space for low-latency data.

According to an embodiment, the receiving STA may receive information about the second duration in which the inter-frame space for low-latency data is used in the second STA through a beacon frame. The receiving STA may perform channel access through EDCA within the second duration, based on a conventional standard.

For example, the first duration and the second duration may be set within the beacon interval. In other words, the duration between the first beacon and the second beacon following the first beacon may include the first duration and the second duration.

In step S3230, the receiving STA may transmit low-latency data. According to an embodiment, the receiving STA may transmit low-latency data based on the channel access.

Figure 33:
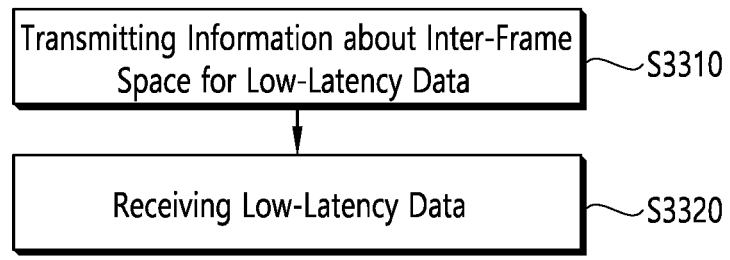
FIG. 33 is a flowchart illustrating an operation of a transmitting STA.

FIG. 33 is a flowchart illustrating an operation of a transmitting STA.

Referring to FIG. 33, in step S3310, the transmitting STA may transmit information about an inter-frame space for low-latency data. For example, low-latency data may include time-delay sensitive traffic. For example, low-latency data may include data requiring a time delay value less than or equal to a threshold value.

For example, the inter-frame space for low-latency data may be referred to as the Low Latency Inter-Frame Space (LLIFS).

For example, the inter-frame space for low-latency data may be set to be larger than a Point Coordination Function Inter-frame Space (PIFS) and smaller than a Distributed Inter-Frame Space (DIFS). As an example, the inter-frame space for low-latency data may be determined/set based on Equation 15 described above.

For example, information about the inter frame space (IFS) for low-latency data (or low-latency traffic) may include information about the value of the Shift_time of Equation 15.

Accordingly, the receiving STA may check the value of the LLIFS based on the received information on the value of the Shift_time.

According to an embodiment, the transmitting STA may determine the inter-frame space for low-latency data before transmitting information about the inter-frame space for low-latency data. For example, the transmitting STA may determine the above-described value of the Shift_time.

For example, the transmitting STA may set the inter-frame space for low-latency data differently for each receiving STA connected to the transmitting STA. As an example, the transmitting STA may set the value of the Shift_time of the first STA to 3 µs. The transmitting STA may set the value of the Shift_time of the second STA to 4 µs.

According to an embodiment, the transmitting STA may receive information that low-latency data is scheduled to be transmitted from the receiving STA. The transmitting STA may operate in a first mode for transmitting and receiving low-latency data. The transmitting STA may transmit information about the inter-frame space for low-latency data based on the first mode.

According to an embodiment, the transmitting STA may transmit information about parameters for EDCA. For example, the information about the parameters for the EDCA may include a CWmin, a CWmax, and a TXOP limit. The CWmin, the CWmax, and the TXOP limit may be set based on the access category. For example, when the LLIFS is used, the value of the CWmin may be set to 0. In other words, when the LLIFS is used, the value of the backoff counter may be set to 0 in the initial transmission.

In step S3320, the transmitting STA may receive low-latency data. According to an embodiment, the transmitting STA may receive low-latency data based on information about the inter-frame space for low-latency data.

According to an embodiment, the receiving STA may transmit low-latency data through the EDCA based on information about the inter-frame space for low-latency data, and the transmitting STA may receive the low-latency data.

According to an embodiment, the transmitting STA may transmit, through a beacon frame, information about the first duration in which the inter-frame space for low-latency data is used. In the first section, the receiving STA may perform channel access through EDCA, based on the inter-frame space for low-latency data, and transmit low-latency data. The transmitting STA may receive the low-latency data.

For example, the first duration may be set as a beacon space. In other words, the transmitting STA may transmit the first beacon and the second beacon following the first beacon at a specified period. The transmitting STA may allow/allow the receiving STA to use the interframe space for low-latency data during the interval between the first beacon and the second beacon (that is, the first duration).

According to an embodiment, the transmitting STA may transmit, through a beacon frame, information about the second duration in which the inter-frame space for low-latency data is used in the second STA.

For example, the transmitting STA may receive low-latency data from the receiving STA based on the inter-frame space for low-latency data within the first duration. The transmitting STA may receive data (for example, low-latency data) from the second STA based on the conventional standard within the first duration.

For example, the transmitting STA may receive data (for example, low-latency data) from the receiving STA based on the conventional standard within the second duration. The transmitting STA may receive low-latency data from the second STA based on the inter-frame space for low-latency data within the second duration.

For example, the first duration and the second duration may be set within the beacon section. In other words, the duration between the first beacon and the second beacon following the first beacon may include the first duration and the second duration.

The technical features of the present disclosure described above may be applied to various devices and methods. For example, the above-described technical features of the present disclosure may be performed/supported through the apparatus of FIGS. 1 and/or 19. For example, the above-described technical features of the present disclosure may be applied only to a part of FIGS. 1 and/or 19. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the device of the present specification may comprise a processor; and a memory coupled to the processor, wherein the processor is configured to: receive information on an inter-frame space (IFS) for low-latency data, wherein the inter-frame space for the low-latency data is configured to be larger than a Point Coordination Function Inter-frame Space (PIFS) and smaller than a Distributed Inter-Frame Space (DIFS), perform channel access through an Enhanced Distributed Channel Access (EDCA) based on the inter-frame space for the low-latency data, and transmit the low-latency data based on the channel access.

The technical features of the present disclosure may be implemented based on a computer readable medium (CRM). For example, a CRM proposed by the present disclosure may store instructions which perform operations including the steps of receiving information on an inter-frame space (IFS) for low-latency data, wherein the inter-frame space for the low-latency data is configured to be larger than a Point Coordination Function Inter-frame Space (PIFS) and smaller than a Distributed Inter-Frame Space (DIFS);

performing channel access through an Enhanced Distributed Channel Access (EDCA) based on the inter-frame space for the low-latency data; and transmitting the low-latency data based on the channel access. The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a receiving station (STA) in a wireless local area network system, the method comprising:
receiving information on an inter-frame space (IFS) for low-latency data,
wherein the inter-frame space for the low-latency data is configured to be larger than a Point Coordination Function Inter-frame Space (PIFS) and smaller than a Distributed Inter-Frame Space (DIFS);
performing channel access through an Enhanced Distributed Channel Access (EDCA) based on the inter-frame space for the low-latency data; and
transmitting the low-latency data based on the channel access.

2. The method of claim 1, wherein the method further comprises,
receiving information related to parameters for the EDCA.

3. The method of claim 1,
wherein the parameters for the EDCA include CWmin, CWmax, and TXOP limit.

4. The method of claim 3,
wherein the value of the CWmin is configured to 0.

5. The method of claim 1,
wherein the inter-frame space for the low-latency data is determined by an equation below, <LLIFS=PIFS+Shift_time> wherein the LLIFS means the inter-frame space for the low-latency data,
wherein the PIFS is configured to 25 μs, and
wherein the Shift_time is configured to one of 0 μs to 9 μs.

6. The method of claim 1, wherein the method further comprises,
receiving, through a beacon frame, information related to a first duration in which the inter-frame space for the low-latency data is used.

7. The method of claim 6, wherein performing the channel access through the EDCA based on the inter-frame space for the low-latency data comprises, performing the channel access through the EDCA, in the first duration, based on the inter-frame space for the low-latency data.

8. The method of claim 1,
wherein the low-latency data requires a time delay value lower than or equal to a threshold value.

9. A method performed by a transmitting STA in a wireless local area network system, the method comprising:
transmitting information related to the inter-frame space (IFS) for low-latency data,
wherein the inter-frame space for the low-latency data is configured to be larger than a Point Coordination Function Inter-frame Space (PIFS) and smaller than a Distributed Inter-Frame Space (DIFS); and
receiving the low-latency data based on the information related to the inter-frame space for the low-latency data.

10. A receiving STA in a wireless local area network system, the receiving STA comprising:
a transceiver for transmitting and receiving a radio signal; and
a processor coupled to the transceiver, the processor is configured to:
receive information on an inter-frame space (IFS) for low-latency data,
wherein the inter-frame space for the low-latency data is configured to be larger than a Point Coordination Function Inter-frame Space (PIFS) and smaller than a Distributed Inter-Frame Space (DIFS);
perform channel access through an Enhanced Distributed Channel Access (EDCA) based on the inter-frame space for the low-latency data; and
transmit the low-latency data based on the channel access.

11. The receiving STA of claim 10, wherein the processor is further configured to:
receive information related to parameters for the EDCA.

12. The receiving STA of claim 10,
wherein the parameters for the EDCA include CWmin, CWmax, and TXOP limit.

13. The receiving STA of claim 12,
wherein the value of the CWmin is configured to 0.

14. The receiving STA of claim 10,
wherein the inter-frame space for the low-latency data is determined by an equation below, <LLIFS=PIFS+Shift_time> wherein the LLIFS means the inter-frame space for the low-latency data,
wherein the PIFS is configured to 25 μs, and
wherein the Shift_time is configured to one of 0 μs to 9 μs.

15. The receiving STA of claim 10, wherein the processor is further configured to:
receive, through a beacon frame, information related to a first duration in which the inter-frame space for the low-latency data is used.

16. The receiving STA of claim 15, wherein the processor is further configured to:
perform the channel access through the EDCA, in the first duration, based on the inter-frame space for the low-latency data.

17. The receiving STA of claim 10,
wherein the low-latency data requires a time delay value lower than or equal to a threshold value.

* * * * *